United States Patent
Zhai

(10) Patent No.: US 10,394,072 B2
(45) Date of Patent: Aug. 27, 2019

(54) COLOR FILTER SUBSTRATE, METHOD FOR PREPARING THE SAME, AND DISPLAY PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Yuman Zhai, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 472 days.

(21) Appl. No.: 14/913,486

(22) PCT Filed: Sep. 11, 2015

(86) PCT No.: PCT/CN2015/089423
§ 371 (c)(1),
(2) Date: Feb. 22, 2016

(87) PCT Pub. No.: WO2016/165270
PCT Pub. Date: Oct. 20, 2016

(65) Prior Publication Data
US 2017/0059927 A1    Mar. 2, 2017

(30) Foreign Application Priority Data
Apr. 13, 2015  (CN) .......................... 2015 1 0172510

(51) Int. Cl.
G02F 1/133   (2006.01)
G02F 1/1335  (2006.01)
G02F 1/1339  (2006.01)
G02F 1/1343  (2006.01)

(52) U.S. Cl.
CPC .... G02F 1/133514 (2013.01); G02F 1/13394 (2013.01); G02F 1/13439 (2013.01);
(Continued)

(58) Field of Classification Search
CPC .......................................... G02F 1/133–13398
See application file for complete search history.

(56) References Cited

U.S. PATENT DOCUMENTS

2007/0122722 A1* 5/2007 Kim ...................... G02B 5/201
                                                           430/7
2008/0063954 A1   3/2008 Song
(Continued)

FOREIGN PATENT DOCUMENTS

CN        101546070 A      9/2009
CN        202330955 U      7/2012
(Continued)

OTHER PUBLICATIONS

Machine Translation of JP-2007316378 (A).*
(Continued)

*Primary Examiner* — William R Alexander
*Assistant Examiner* — Jeffrey E Madonna
(74) *Attorney, Agent, or Firm* — Ladas & Parry LLP

(57) ABSTRACT

A color filter substrate, a method for preparing the color filter substrate, and a display panel are provided. The color filter substrate is in contact with the spacer on the surface facing the array substrate. At least one layer of the color filter substrate has a hollow structure at the position corresponding to the spacer.

19 Claims, 16 Drawing Sheets

(52) U.S. Cl.
CPC .. *G02F 1/133516* (2013.01); *G02F 1/133512* (2013.01); *G02F 2001/13398* (2013.01); *G02F 2001/133519* (2013.01)

(56) References Cited

U.S. PATENT DOCUMENTS

| | | | |
|---|---|---|---|
| 2011/0316764 A1* | 12/2011 | Parry-Jones | G02B 26/005 345/60 |
| 2012/0012834 A1* | 1/2012 | Sonoda | G02B 5/201 257/40 |
| 2012/0099055 A1* | 4/2012 | Kim | B29D 11/00634 349/106 |
| 2012/0194764 A1* | 8/2012 | Ishizumi | G02B 5/201 349/69 |
| 2016/0054611 A1 | 2/2016 | Zhao et al. | |

FOREIGN PATENT DOCUMENTS

| | | |
|---|---|---|
| CN | 203299492 U | 11/2013 |
| CN | 104460118 A | 3/2015 |
| CN | 104730762 A | 6/2015 |
| JP | 2007-316378 A | 12/2007 |

OTHER PUBLICATIONS

First Chinese Office Action dated Mar. 20, 2017; Appln. No. 201510172510.1.
International Search Report and Written Opinion dated Jan. 6, 2016; PCT/CN2015/089423.

* cited by examiner

COLOR FILTER SUBSTRATE, METHOD FOR PREPARING THE SAME, AND DISPLAY PANEL

TECHNICAL FIELD

Embodiments of the present invention relate to a color filter substrate, a method for preparing the same and a display panel.

BACKGROUND

A liquid crystal display device (LCD) comprises an array substrate and a color filter substrate, and a liquid crystal filled between the array substrate and the color filter substrate.

In the production process of the liquid crystal display device, firstly, a spacer is formed at a predetermined position on the surface of the color filter substrate facing the array substrate and the liquid crystal is sprayed on the surface of the color filter substrate facing the array substrate. Then, the color filter substrate and the array substrate are cell-assembled to complete the preparation of the liquid crystal display device. The spacer is in contact with the array substrate and the color filter substrate respectively for supporting the array substrate and the color filter substrate such that a space is formed between the array substrate and the color filter substrate and the liquid crystal is arranged within the space.

When the surface of the liquid crystal display device is pressed by an external force, the spacer located between the array substrate and the color filter substrate moves under the external force and departs from the predetermined position. When a light emitted from a back light is irradiated on the liquid crystal display device, stripes would appear on the surface of the liquid crystal display device because the spacer is not located at the same position as the predetermined position, thereby influencing the display effect.

SUMMARY

In order to solve the problem of the stripes which would appear on the surface of the liquid crystal display device and influence the display effect, embodiments of the present invention provide a color filter substrate, a method for preparing the color filter substrate, and a display panel.

In the first aspect, a color filter substrate is provided. The color filter substrate has a surface facing an array substrate and being in contact with a spacer, the color filter substrate has at least one layer having a hollow structure at a position corresponding to the spacer. The hollow structure is used to increase a friction force between the color filter substrate and the spacer. In some embodiments, the hollow structure is configured such that a part of the spacer is protruded into the hollow structure, thereby increasing the friction force between the color filter substrate and the spacer.

In some embodiments, the surface of the spacer that is in contact with the color filter substrate has a concave-convex shape (or a concave-convex structure) thereon. The concave-convex shape can be determined by the hollow structure. In some embodiments, a convex part of the concave-convex shape corresponds to a hollow part of the hollow structure, a concave part of the concave-convex shape corresponds to a non-hollow part of the hollow structure. The concave-convex shape can further increase the friction force between the color filter substrate and the spacer.

In some embodiments, both surfaces of the spacer being in contact with the color filter substrate and the array substrate are provided with a concave-convex shape formed thereon. Under the effect of the concave-convex shape, not only the friction force between the color filter substrate and the spacer but also the friction force between the spacer and the array substrate are increased, thus the spacer can be firmly located between the color filter substrate and the array substrate. In this way, the spacer is prevented from moving under an external force when the display panel formed by cell-assembling the array substrate and the color filter substrate is pressed by the external forces, which enables that the spacer is located at the same position as the predetermined position when a light emitted by a back light is irradiated on the liquid crystal display device. Thus the stripes on the surface of the liquid crystal display device are reduced and the display effect is improved.

In some embodiments, the color filter substrate comprises a transparent substrate which has a surface facing the array substrate and having a color filter layer formed thereon.

The color filter layer comprises a black matrix, a first color pixel located in the same layer as the black matrix, and a second color pixel located on the black matrix. The second color pixel has the hollow structure at the position corresponding to the spacer.

In some embodiments, the color filter substrate comprises a transparent substrate which has a surface facing the array substrate and having a color filter layer formed thereon.

An over-coat layer is formed on the surface of the color filter layer facing the array substrate.

The color filter layer comprises a black matrix, a first color pixel located in the same layer as the black matrix, and a second color pixel located on the black matrix. The over-coat layer has the hollow structure at the position corresponding to the spacer. In some embodiments, the position of the hollow structure and/or the spacer corresponds to that of the second color pixel, that is, the hollow structure and/or the spacer is located in the zone corresponding to the second color pixel.

In some embodiments, the color filter substrate comprises a transparent substrate which has a surface facing the array substrate and having a color filter layer formed thereon; an over-coat layer is formed on the surface of the color filter layer facing the array substrate; a transparent electrode layer is formed on the surface of the over-coat layer facing the array substrate; the color filter layer comprises a black matrix, a first color pixel located in the same layer as the black matrix, and a second color pixel located on the black matrix. The transparent electrode layer has the hollow structure at the position corresponding to the spacer. In some embodiments, the position of the hollow structure and/or the spacer corresponds to that of the second color pixel, that is, the hollow structure and/or the spacer is located in the zone corresponding to the second color pixel.

In some embodiments, the hollow structure comprises a closed loop hollow structure.

In some embodiments, the closed loop hollow structure comprises at least one selected from the group consisting of circular hollow structure and rectangular hollow structure.

In the second aspect, a method for preparing the color filter substrate as described in the first aspect is provided. The method for preparing the color filter substrate comprises: forming a hollow structure in at least one layer of the color filter substrate at the position corresponding to the spacer. The hollow structure may increase the friction force between the spacer and the color filter substrate.

In some embodiments, the color filter substrate comprises a transparent substrate, and forming the hollow structure in at least one layer of the color filter substrate comprises:

forming a color filter layer on the surface of the transparent substrate facing the array substrate, the color filter layer comprising a black matrix, a first color pixel located in the same layer as the black matrix, and a second color pixel located on the black matrix; and forming the hollow structure in the second color pixel at the position corresponding to the spacer.

In some embodiments, the color filter substrate comprises a transparent substrate, and forming the hollow structure in at least one layer of the color filter substrate comprises:

forming a color filter layer on the surface of the transparent substrate facing the array substrate, the color filter layer comprising a black matrix, a first color pixel located in the same layer as the black matrix, and a second color pixel located on the black matrix;

forming an over-coat layer on the surface of the color filter layer facing the array substrate; and forming the hollow structure in the over-coat layer at the position corresponding to the spacer. In some embodiments, the position of the hollow structure and/or the spacer corresponds to that of the second color pixel, that is, the hollow structure and/or the spacer is located in the zone corresponding to the second color pixel.

In some embodiments, the color filter substrate comprises a transparent substrate, and forming the hollow structure in at least one layer of the color filter substrate comprises:

forming a color filter layer on the surface of the transparent substrate facing the array substrate, the color filter layer comprising a black matrix, a first color pixel located in the same layer as the black matrix, and a second color pixel located on the black matrix;

forming an over-coat layer on the surface of the color filter layer facing the array substrate;

forming a transparent electrode layer on the surface of the over-coat layer facing the array substrate; and forming the hollow structure in the transparent electrode layer at the position corresponding to the spacer. In some embodiments, the position of the hollow structure and/or the spacer corresponds to that of the second color pixel, that is, the hollow structure and/or the spacer is located in the zone corresponding to the second color pixel.

In some embodiments, the hollow structure comprises a closed loop hollow structure.

In some embodiments, the closed loop hollow structure comprises at least one of circular hollow structure and rectangular hollow structure.

In the third aspect, a display panel is provided. The display panel comprises a color filter substrate and an array substrate which are cell-assembled. A spacer is provided between the color filter substrate and the array substrate. The structure of the color filter substrate is as described in the first aspect. In some embodiments, the spacer has a concave-convex shape at the position being in contact with the hollow structure. The convex part of the concave-convex shape corresponds to the hollow part of the hollow structure, while the concave part of the concave-convex shape corresponds to the non-hollow part of the hollow structure. In some embodiments, at least one layer of the array substrate has a second hollow structure at the position corresponding to the spacer, or a second hollow structure is formed on the surface of the array substrate facing the color filter substrate at the position corresponding to the spacer. The second hollow structure and the hollow structure formed on the color filter substrate can independently have similar structures. In some embodiments, the spacer has a second concave-convex shape at the position of the second hollow structure. The convex part of the second concave-convex shape corresponds to the hollow part of the second hollow structure, while the concave part of the second concave-convex shape corresponds to the non-hollow part of the second hollow structure.

The present invention provides a color filter substrate, a method for preparing the color filter substrate, and a display panel. Because at least one layer of the color filter substrate is a hollow structure which is used to increase the friction force between the color filter substrate and the spacer, the friction force between the spacer and the color filter substrate is increased. When the surface of the liquid crystal display device is pressed by a external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

It should be understood that the aforementioned general description and the aftermentioned detailed description are merely exemplary and explanatory rather than limitative of the present invention.

BRIEF DESCRIPTION OF THE DRAWINGS

In order to illustrate the technical solutions of the embodiments of the present invention more clearly, the figures of the embodiments are briefly described below. Apparently, the figures described below merely relate to some embodiments of the present invention rather than are limitative of the present invention.

FIG. 3-1 is a plan view of a color filter substrate on which a color filter layer is formed provided in an embodiment of the present application.

FIG. 3-2 is another specific structural schematic view of a color filter substrate provided in an embodiment of the present application.

FIG. 4-1 is another specific structural schematic view of another color filter substrate provided in an embodiment of the present application.

FIG. 4-2 is yet another specific structural schematic view of another color filter substrate provided in an embodiment of the present application.

FIG. 5-1 is another specific structural schematic view of yet another color filter substrate provided in an embodiment of the present application.

FIG. 11-1 is a process flow view of a second specific method for preparing a color filter substrate provided in an embodiment of the present application.

FIG. 16-1 is a process flow view of a fourth specific method for preparing a color filter substrate provided in an embodiment of the present application.

FIG. 16-2 is a process flow view of a fifth specific method for preparing a color filter substrate provided in an embodiment of the present application.

FIG. 20-1 is a process flow view of a seventh specific method for preparing a color filter substrate provided in an embodiment of the present application.

DETAILED DESCRIPTION

To make the object, technical solutions, and advantages of the embodiments of the present invention clearer, the technical solutions of the embodiments of the present invention will be described below in a clearer and more complete way with reference to the figures of the embodiments of the present invention. Apparently, the embodiments described are only part, rather than all of the embodiments of the present invention. Based on the embodiments of the present invention described, all the other embodiments obtained by a person of ordinary skills in the art without paying inventive work fall into the scope of protection of the present invention.

Figure 1:
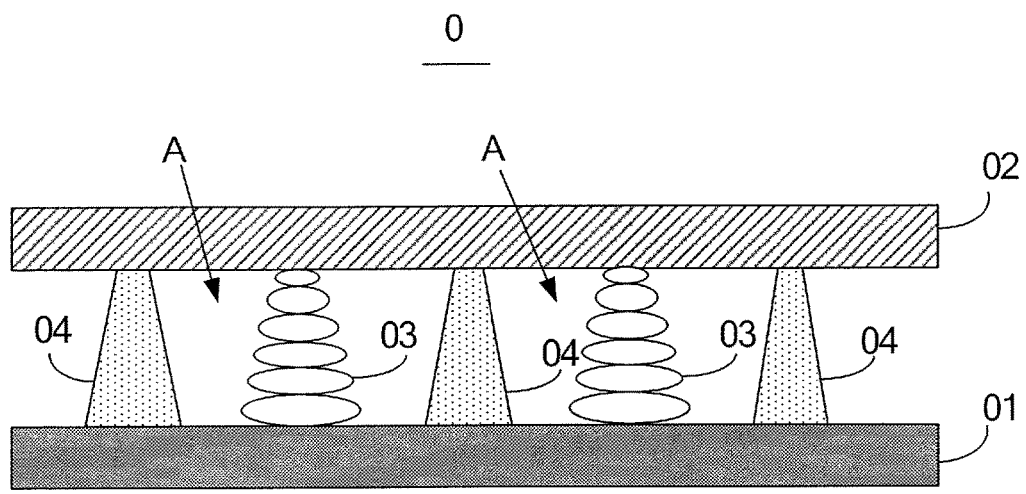
FIG. 1 is a structural schematic view of a display panel provided in an embodiment of the present application.

As shown in FIG. 1, an embodiment of the present invention provides a display panel 0. The display panel 0 may comprise: a color filter substrate 01 and an array substrate 02 which are cell-assembled; and a liquid crystal 03 filled between the color filter substrate 01 and the array substrate 02. A spacer 04 is provided between the color filter substrate 01 and the array substrate 02 and is contacted with the array substrate 01 and the color filter substrate 02 respectively for supporting the array substrate 01 and the color filter substrate 02 such that a space A is formed between the array substrate 01 and the color filter substrate 02 and the liquid crystal 03 is arranged within the space A.

Figure 2:
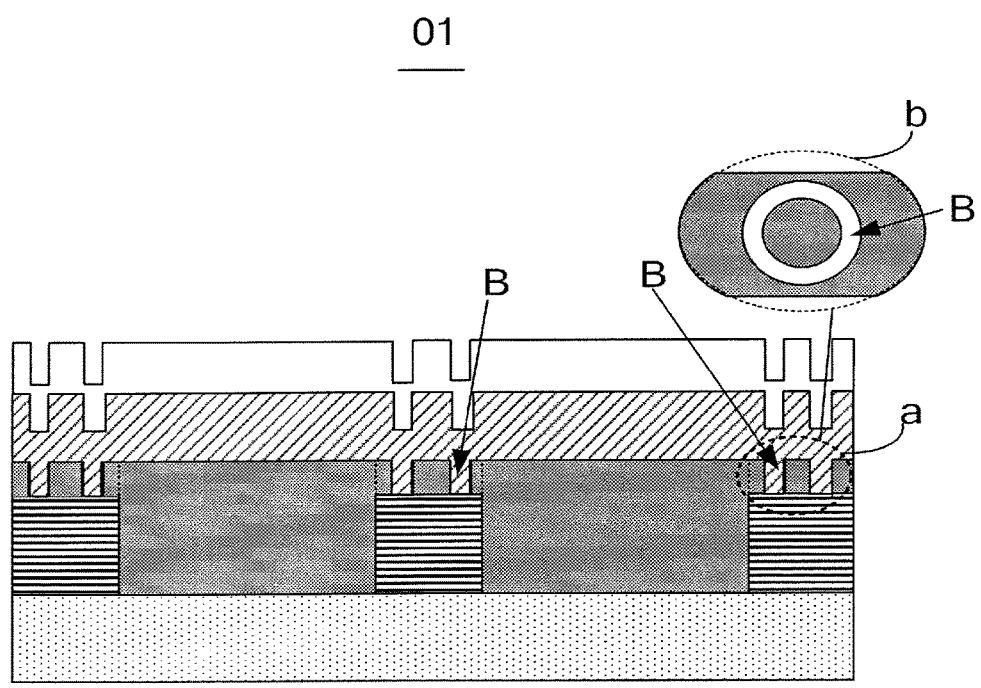
FIG. 2 is a structural schematic view of a color filter substrate provided in an embodiment of the present application.

As shown in FIG. 2, an embodiment of the present invention provides a color filter substrate 01. A surface of the color filter substrate 01 facing the array substrate 02 in FIG. 1 is in contact with the spacer 04 in FIG. 1.

At least one layer of the color filter substrate 01 has a hollow structure B for increasing the friction force between the color filter substrate 01 and the spacer 04 in FIG. 1.

In the present application, the term "hollow structure" means an opening structure in which non-opening parts exists in the opening zone, that is, the opening structure comprises hollow parts and non-hollow parts.

In summary, in the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

Furthermore, FIG. 2 is a sectional view of the color filter substrate 01. The zone a in FIG. 2 is the zone provided with the hollow structure B in the color filter substrate 01. The zone b in FIG. 2 is the plan view of the zone a. The hollow part of the hollow structure B in the zone b may have an annular shape. It needs to be noted that the hollow part of the hollow structure B may have other shapes which has not been restricted in the embodiments of the present invention. Because at least one layer of the color filter substrate provided in the embodiment of the present invention is a hollow structure, that is, a stage difference occurs on the surface of the color filter substrate, thus stage differences also occur on the bottom surface and the top surface of the spacer formed on the color filter substrate. Under the effect of the hollow structure, a concave-convex shape is formed on the bottom surface and the top surface of the spacer, and on the surface of the spacer 04 being in contact with the color filter substrate, the convex part of the concave-convex shape corresponds to the hollow part of the hollow structure, while the concave part of the concave-convex shape corresponds to the non-hollow part of the hollow structure. The bottom surface and the top surface of the spacer are in contact with the color filter substrate and the array substrate, respectively. Under the effect of the concave-convex shape, not only the friction force between the color filter substrate and the spacer but also the friction force between the spacer and the array substrate are increased, and the spacer can be firmly located between the color filter substrate and the array substrate. In this way, the spacer is prevented from moving under an external force when the display panel formed by cell assembly from the array substrate and the color filter substrate is pressed by the external force.

Figure 3:
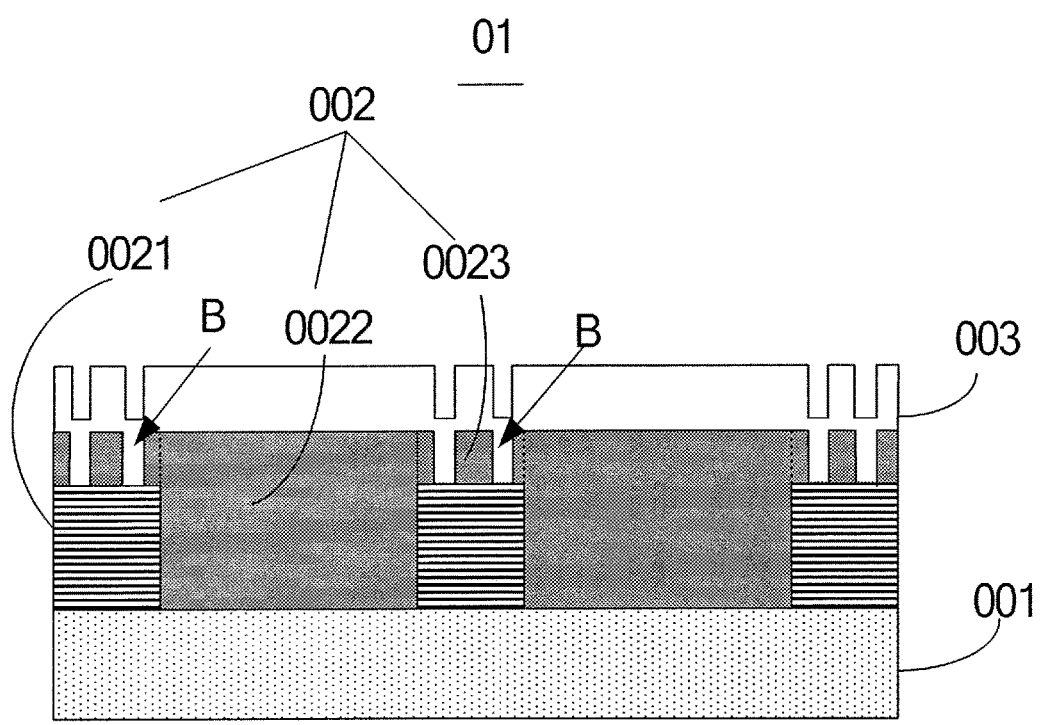
FIG. 3 is a specific structural schematic view of a color filter substrate provided in an embodiment of the present application.
Figures 1, 3:
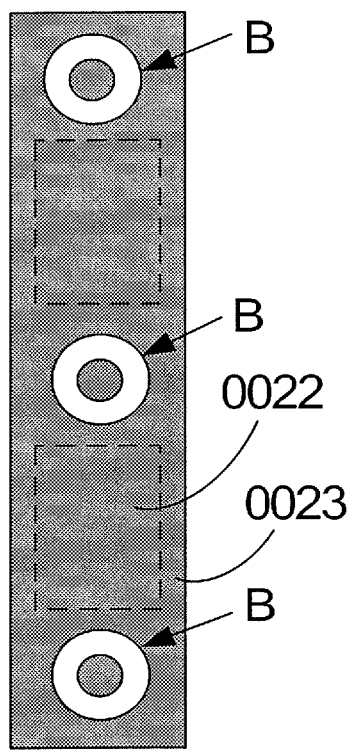
Figures 2, 3:
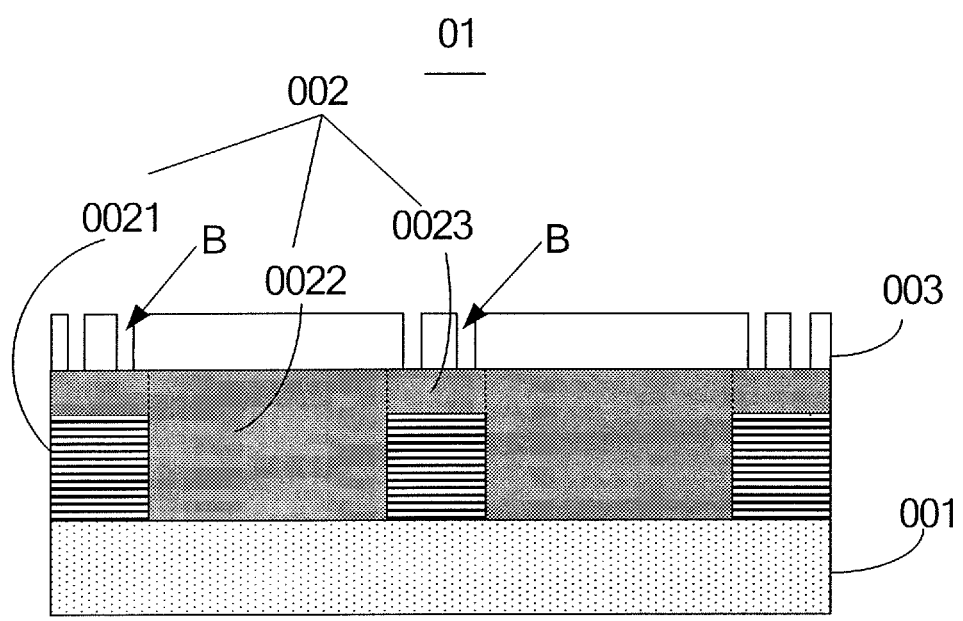

As shown in FIG. 3, an embodiment of the present invention provides a specific structure of a color filter substrate 01. It needs to be noted that the color filter substrate 01 as shown in FIG. 3 can be suitable for display panels having a Twisted Nematic (TN) structure. The color filter substrate 01 may comprise a transparent substrate 001, a color filter layer 002 and a transparent electrode layer 003.

The color filter layer 002 is formed on the surface of the transparent substrate 001 facing the array substrate 02 in FIG. 1. The color filter layer 002 may comprises a black matrix 0021, a first color pixel 0022 located in the same layer as the black matrix 0021, and a second color pixel 0023 located on the black matrix 0021, and the second color pixel 0023 has a hollow structure B at the position corresponding to the spacer 04 in FIG. 1. FIG. 3-1 is the plan view of a color filter substrate on which the color filter layer 002 is formed provided in an embodiment of the present invention. As shown in FIG. 3-1, a hollow structure B is formed in the second color pixel 0023, which is located on the black matrix, at the position corresponding to the spacer 04 in FIG. 1. The hollow structure B is a circular hollow structure, and the opening zone (not shown in FIG. 3-1) of the circular hollow structure is ring-shaped. The transparent electrode layer 003 may be arranged on the surface of the color filter layer 002 with the hollow structure B. Because the color filter layer 002 is provided with the hollow structure B on the surface thereof and the transparent electrode layer 003 has a smaller thickness, the transparent electrode layer 003 is formed with a concave-convex shape (not shown in FIG. 3) under the influence of the color filter layer 002. In the color filter substrate 01 shown in FIG. 3, the spacer 04 in FIG. 1 may be in contact with the surface of the transparent electrode layer 003 facing the array substrate 02 in FIG. 1. The concave-convex shape is used to increase the friction force between the color filter substrate 01 and the spacer 04 in FIG. 1.

In some embodiments, as shown in FIG. 3-2, an embodiment of the present invention provides another specific structure of a color filter substrate 01. The color filter substrate 01 comprises a transparent substrate 001, a color filter layer 002 and a transparent electrode layer 003, that is, the hollow structure B can be formed in the transparent electrode layer 003 located on the color filter layer 002 rather than formed in the second color pixel 0023, which is located on the black matrix in FIG. 3, at the position corresponding to the spacer 04 in FIG. 1 such that the color filter substrate 002 has a hollow structure B which increases the friction force between the color filter substrate 01 and the spacer 04 in FIG. 1.

Figure 4:
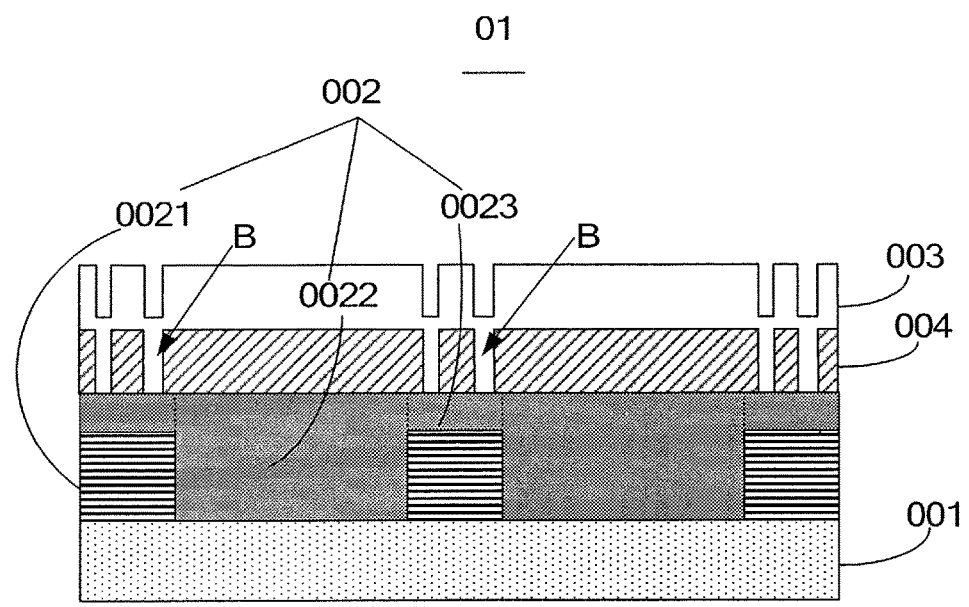
FIG. 4 is a specific structural schematic view of another color filter substrate provided in an embodiment of the present application.
Figures 1, 4:
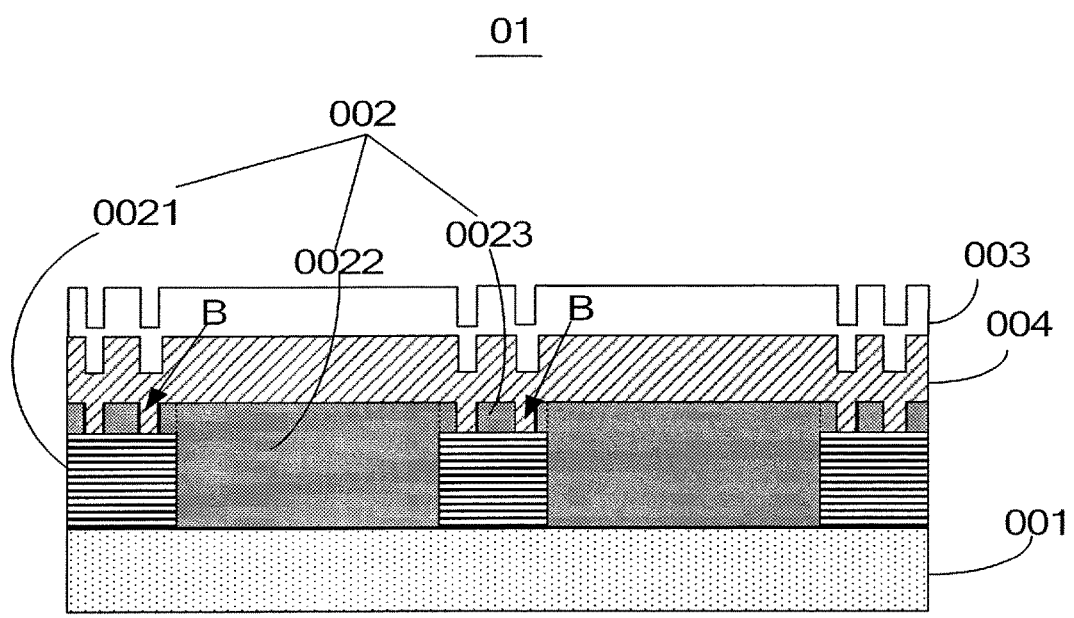
Figures 2, 4:
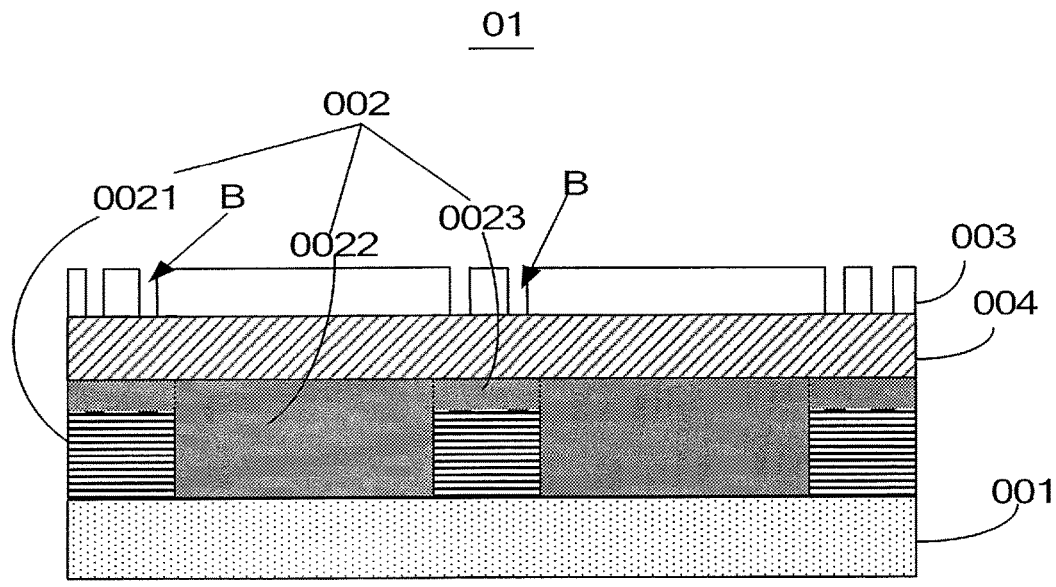

As shown in FIG. 4, an embodiment of the present invention provides a specific structure of another color filter substrate 01. The color filter substrate 01 shown in FIG. 4 can be suitable for display panels having a Twisted Nematic structure. The color filter substrate may comprises a transparent substrate 001, a color filter layer 002, a transparent electrode layer 003 and an over-coat (OC) layer 004.

The color filter layer 002 is formed on the surface of the transparent substrate 001 facing the array substrate 02 in FIG. 1. The over-coat layer 004 is formed on the surface of the color filter layer 002 facing the array substrate 02 in FIG. 1. The color filter layer 002 may comprises a black matrix 0021, a first color pixel 0022 located in the same layer as the black matrix 0021, and a second color pixel 0023 located on the black matrix 0021. The over-coat layer 004 has the hollow structure B at the position corresponding to the spacer 04 in FIG. 1, and the hollow structure B corresponds to the second color pixel 0023 of the color filter layer 002. Because the over-coat layer 004 is provided with the hollow structure B therein and the transparent electrode layer 003 has a small thickness, the transparent electrode layer 003 is formed with a concave-convex shape (not shown in FIG. 4) under the influence of the over-coat layer 004. In the color filter substrate 01 shown in FIG. 4, the spacer 04 in FIG. 1 may be in contact with the surface of the transparent electrode layer 003 facing the array substrate 02 in FIG. 1. The concave-convex shape is used to increase the friction force between the color filter substrate 01 and the spacer 04 in FIG. 1.

In some embodiments, as shown in FIG. 4-1, an embodiment of the present invention provides another specific structure of another color filter substrate 01. When the color filter substrate 01 comprises a transparent substrate 001, a color filter layer 002, a transparent electrode layer 003 and an over-coat layer 004, the hollow structure B can be formed in the second color pixel 0023, which is located on the black matrix in FIG. 3, at the position corresponding to the spacer 04 in FIG. 1 rather than formed in the over-coat layer 004 at the position corresponding to the spacer in FIG. 1 such that the color filter substrate 002 has a hollow structure B which increases the friction force between the color filter substrate 01 and the spacer 04 in FIG. 1.

In some embodiments, as shown in FIG. 4-2, an embodiment of the present invention provides yet another specific structure of another color filter substrate 01. When the color filter substrate 01 may comprise a transparent substrate 001, a color filter layer 002, a transparent electrode layer 003 and an over-coat layer 004, the hollow structure B can be formed in the transparent electrode layer 003 at the position corresponding to the spacer 04 in FIG. 1 rather than formed in the over-coat layer 004 at the position corresponding to the spacer in FIG. 1, and the hollow structure B corresponds to the second color pixel 0023 of the color filter layer 002 such that the color filter substrate 002 has a hollow structure B which increases the friction force between the color filter substrate 01 and the spacer 04 in FIG. 1.

Figure 5:
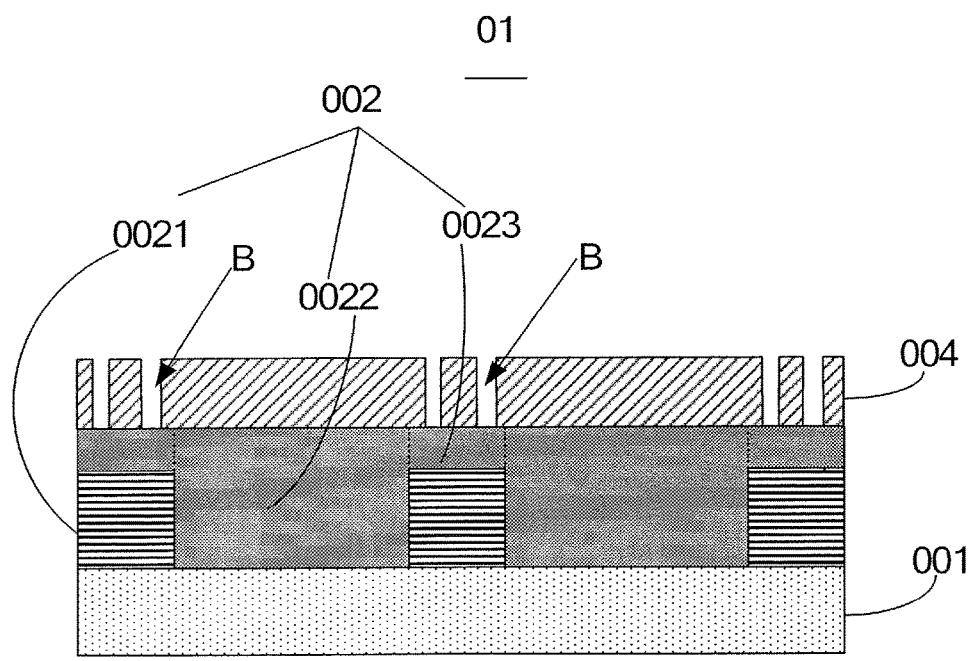
FIG. 5 is a specific structural schematic view of yet another color filter substrate provided in an embodiment of the present application.
Figures 1, 5:
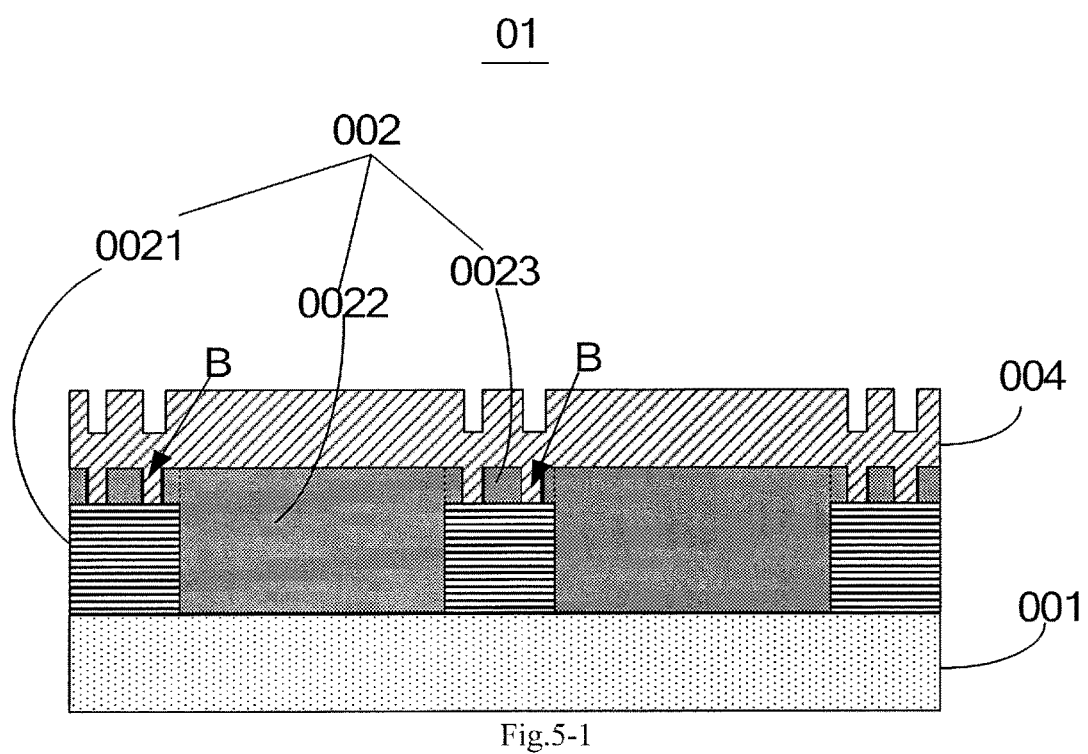

As shown in FIG. 5, an embodiment of the present invention provides a specific structure of yet another color filter substrate 01. It needs to be noted that the color filter substrate shown in FIG. 5 can be suitable for Advanced Super Dimension Switch (ADS) display panels. The color filter substrate may comprises a transparent substrate 001, a color filter layer 002 and an over-coat layer 004.

The color filter layer 002 is formed on the surface of the transparent substrate 001 facing the array substrate 02 in FIG. 1. The over-coat layer 004 is formed on the surface of the color filter layer 002 facing the array substrate 02 in FIG. 1. The color filter layer 002 may comprises a black matrix 0021, a first color pixel 0022 located in the same layer as the black matrix 0021, and a second color pixel 0023 located on the black matrix 0021. The over-coat layer 004 has a hollow structure B at the position corresponding to the spacer 04 in FIG. 1, and the hollow structure B corresponds to the second color pixel 0023 of the color filter layer 002. In the color filter substrate 01 shown in FIG. 4-1, the spacer 04 in FIG. 1 may be in contact with the surface of the over-coat layer 004 facing the array substrate 02 in FIG. 1, and the hollow structure B is used to increase the friction force between the color filter substrate 01 and the spacer 04 in FIG. 1.

In some embodiments, as shown in FIG. 5-1, an embodiment of the present invention provides another specific structure of yet another color filter substrate 01. When the color filter substrate 01 comprises a transparent substrate 001, a color filter layer 002 and an over-coat layer 004, the hollow structure B can be formed in the second color pixel 0023, which is located on the black matrix in FIG. 3, at the position corresponding to the spacer 04 in FIG. 1 rather than formed in the over-coat layer 004 at the position corresponding to the spacer in FIG. 1 such that the color filter substrate 002 has a hollow structure B which increases the friction force between the color filter substrate 01 and the spacer 04 in FIG. 1.

Figure 6:
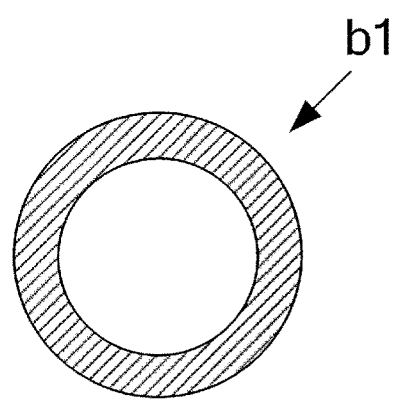
FIG. 6 is a schematic view of the shape of a circular hollow opening provided in an embodiment of the present application.
Figure 7:
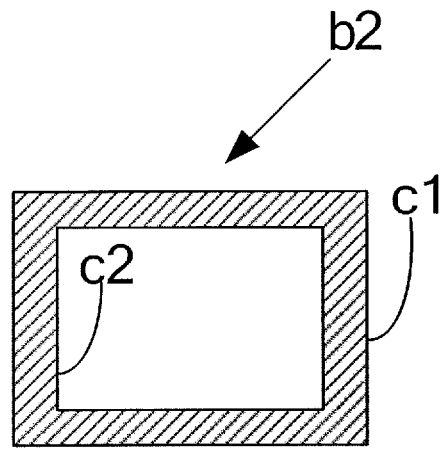
FIG. 7 is a schematic view of the shape of a rectangular hollow opening provided in an embodiment of the present application.

For example, the aforementioned hollow structure B may comprise a closed loop hollow structure. The closed loop hollow structure may comprise at least one of the circular hollow structure and rectangular hollow structure. The closed loop hollow structure may be divided into opening zones and non-opening zones. Specifically, as shown in FIGS. 6-7, FIG. 6 is a schematic view of the shape of a circular hollow opening zone provided in an embodiment of the present invention, and FIG. 7 is a schematic view of the shape of a rectangular hollow opening zone provided in an embodiment of the present invention. As shown in FIG. 6, the opening zone b1 of the circular hollow structure may be ring-shaped. As shown in FIG. 7, the opening zone b2 of the rectangular hollow structure may be formed by two sleeve-joined rectangles. The two sleeve-joined rectangles may have similar patterns and coincident centers. For example, the similar patterns are two patterns in which corresponding angles are equals and ratios of corresponding sides are equals. As shown in FIG. 7, the two sleeve-joined rectangles are the rectangle c1 and the rectangle c2, respectively, wherein the rectangle c1 is sleeve-joined outside of the rectangle c2, and the rectangle c1 and the rectangle c2 have similar patterns. It needs to be noted that the hollow structures B may comprises both circular hollow structure and rectangular hollow structure when the number of the hollow structures B is larger than or equal to 2, which has not been restricted in the embodiments of the present invention.

In prior art, the spacer is arranged at a predetermined position directly between the color filter substrate and the array substrate in the display panel. In practical application, when the color filter substrate or the array substrate is pressed by an external force, the spacer would move under the external force, that is, the spacer departs from the predetermined position. When a light emitted from a back light is irradiated on the liquid crystal display device, stripes would appear on the surface of the liquid crystal display device because the spacer is not located at the same position as the predetermined position, thereby influencing the display effect. If the surface of the color filter substrate or the array substrate is scratched by the spacer during the movement thereof, the display effect of the display panel would also be influenced. In the color filter substrate provided in the embodiment of the present invention, the spacer may be prevented from moving under an external force because of the relative larger friction force between the color filter substrate and the spacer. When a light emitted from a back light is irradiated on the liquid crystal display device, the spacer is not located at the same position as the predetermined position such that stripes would appear on the surface of the liquid crystal display device because the spacer is not located at the same position as the predetermined position such that the stripes on the surface of the liquid crystal display device would be reduced and the surface of the color filter substrate or the array substrate would not be scratched by the spacer. Therefore the display effect of the display panel is improved.

In summary, in the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

An embodiment of the present invention provides a method for preparing a color filter substrate. The method for preparing the color filter substrate can be used for preparing the color filter substrate as shown in FIG. 2, FIG. 3, FIG. 3-2, FIG. 4, FIG. 4-1, FIG. 4-2, FIG. 5 or FIG. 5-1. The method for preparing the color filter substrate may comprise: forming a hollow structure in at least one layer of the color filter substrate. The hollow structure may increase the friction force between the spacer and the color filter substrate.

In summary, in the method for preparing the color filter substrate provided in the embodiment of the present invention, because at least one layer of the color filter substrate has a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

Furthermore, the color filter substrate may comprise a transparent substrate, and forming the hollow structure in at least one layer of the color filter substrate may comprise: forming a color filter layer on the surface of the transparent substrate facing the array substrate, the color filter layer comprising a black matrix, a first color pixel located in the same layer as the black matrix, and a second color pixel located on the black matrix; and forming a hollow structure in the second color pixel at the position corresponding to the spacer.

In some embodiments, the color filter substrate may comprise a transparent substrate, and forming the hollow structure in at least one layer of the color filter substrate may comprise: forming a color filter layer on the surface of the transparent substrate facing the array substrate, the color filter layer comprising a black matrix, a first color pixel located in the same layer as the black matrix, and a second color pixel located on the black matrix; forming an over-coat layer on the surface of the color filter layer facing the array substrate; and forming the hollow structure in the over-coat layer at the position corresponding to the spacer. In some embodiments, the position of the hollow structure and/or the spacer corresponds to that of the second color pixel, that is, the hollow structure and/or the spacer is located in the zone corresponding to the second color pixel.

In some embodiments, the color filter substrate may comprise a transparent substrate, and forming the hollow structure in at least one layer of the color filter substrate may comprise: forming a color filter layer on the surface of the transparent substrate facing the array substrate, the color filter layer comprising a black matrix, a first color pixel located in the same layer as the black matrix, and a second color pixel located on the black matrix; forming an over-coat layer on the surface of the color filter layer facing the array substrate; forming a transparent electrode layer on the surface of the over-coat layer facing the array substrate; and forming the hollow structure in the transparent electrode layer at the position corresponding to the spacer. In some embodiments, the position of the hollow structure and/or the spacer corresponds to that of the second color pixel, that is, the hollow structure and/or the spacer is located in the zone corresponding to the second color pixel.

For example, the hollow structure may comprise a closed loop hollow structure. The closed loop hollow structure may comprise at least one selected from the group consisting of circular hollow structure and rectangular hollow structure.

In summary, in the method for preparing the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

Figure 8:
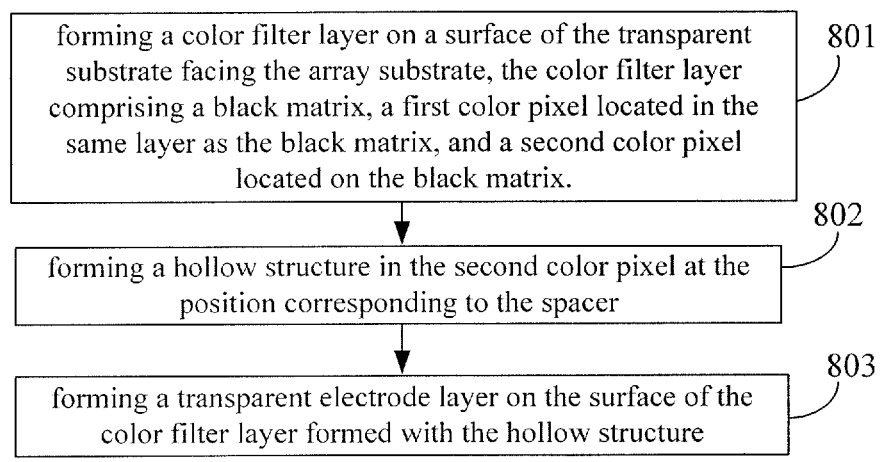
FIG. 8 is a process flow view of a first specific method for preparing a color filter substrate provided in an embodiment of the present application.

As shown in FIG. 8, an embodiment of the present invention provides a first specific method for preparing a color filter substrate. The method for preparing the color filter substrate can be used for preparing the color filter substrate as shown in FIG. 3. It needs to be noted that the color filter substrate 01 as shown in FIG. 3 can be suitable for display panels having a Twisted Nematic (TN) structure. The color filter substrate may comprise a transparent substrate, and the method for preparing the color filter substrate may comprise steps 801, 802, and 803.

Step 801: forming a color filter layer on a surface of the transparent substrate facing the array substrate, the color filter layer comprising a black matrix, a first color pixel located in the same layer as the black matrix, and a second color pixel located on the black matrix.

Figure 9:
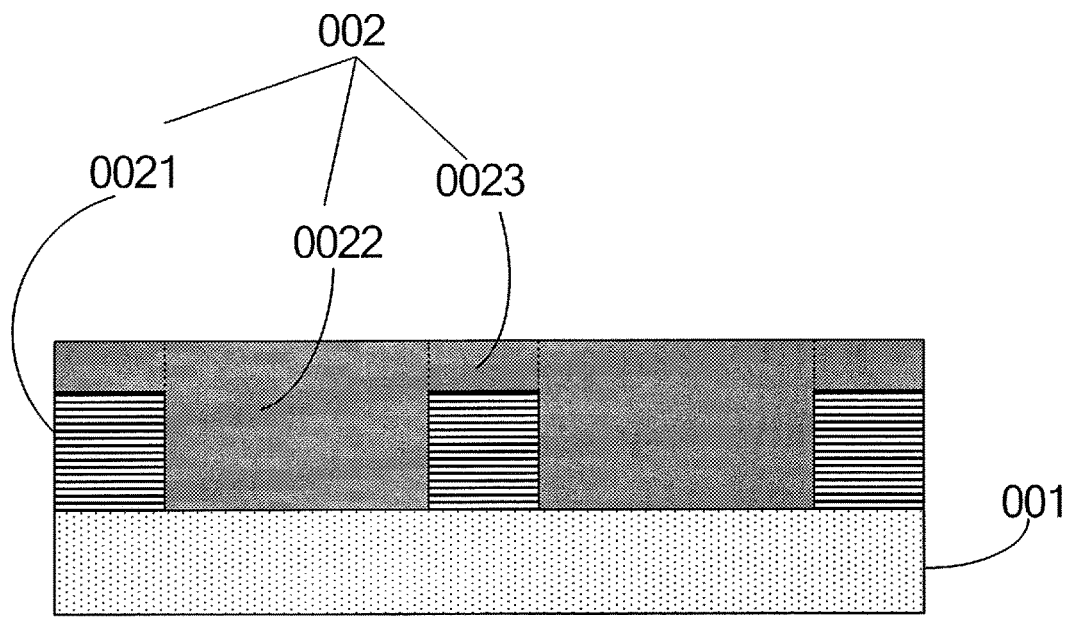
FIG. 9 is a structural schematic view of forming a color filter layer on a transparent substrate in the first specific preparation method provided in an embodiment of the present application.

For example, as shown in FIG. 9, a color filter layer 002 may be formed on the surface of the transparent substrate 001 facing the array substrate by a patterning process, and the color filter layer 002 may comprise a black matrix 0021, a first color pixel 0022 located in the same layer as the black matrix 0021, and a second color pixel 0023 located on the black matrix 0021. In an embodiment, the patterning process may comprise photoresist coating, exposure, development, etching, photoresist stripping and other processes. As for the specific steps for forming a color filter layer 002 on the surface of the transparent substrate 001 facing the array substrate, reference may be made to the specific steps for forming a color filter layer on the transparent substrate in prior art and need not to be described in the embodiments of the present invention.

Step 802: forming a hollow structure in the second color pixel at the position corresponding to the spacer.

Figure 10:
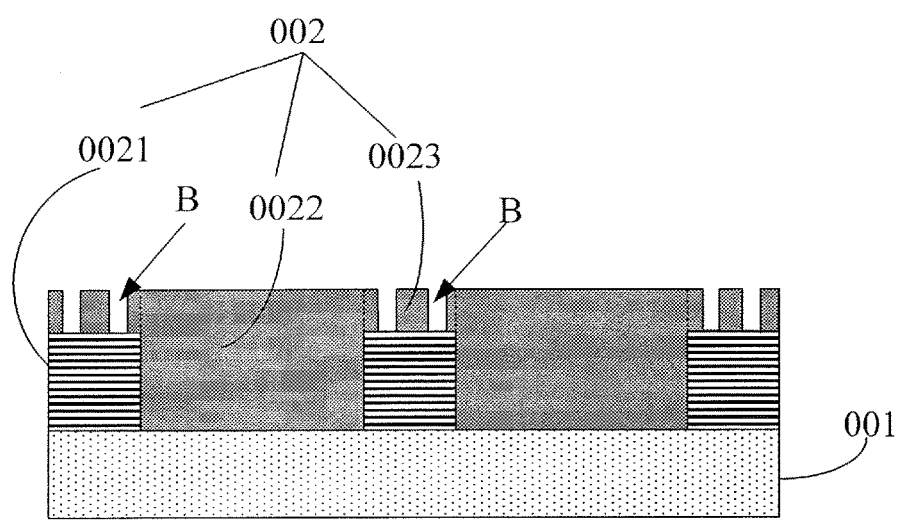
FIG. 10 is a structural schematic view of forming a hollow structure in subpixel in the first specific preparation method provided in an embodiment of the present application.

As shown in FIG. 10, a hollow structure B may be formed in the second color pixel 0023 at the position corresponding to the spacer by a patterning process. The patterning process may comprise photoresist coating, exposure, development, etching, photoresist stripping and other processes. It needs to be noted that the hollow structure B may be formed in the second color pixel 0023 at the position corresponding to the spacer by other patterning process which is not restricted in the embodiments of the present invention.

Step 803: forming a transparent electrode layer on the surface of the color filter layer formed with the hollow structure.

Figure 11:
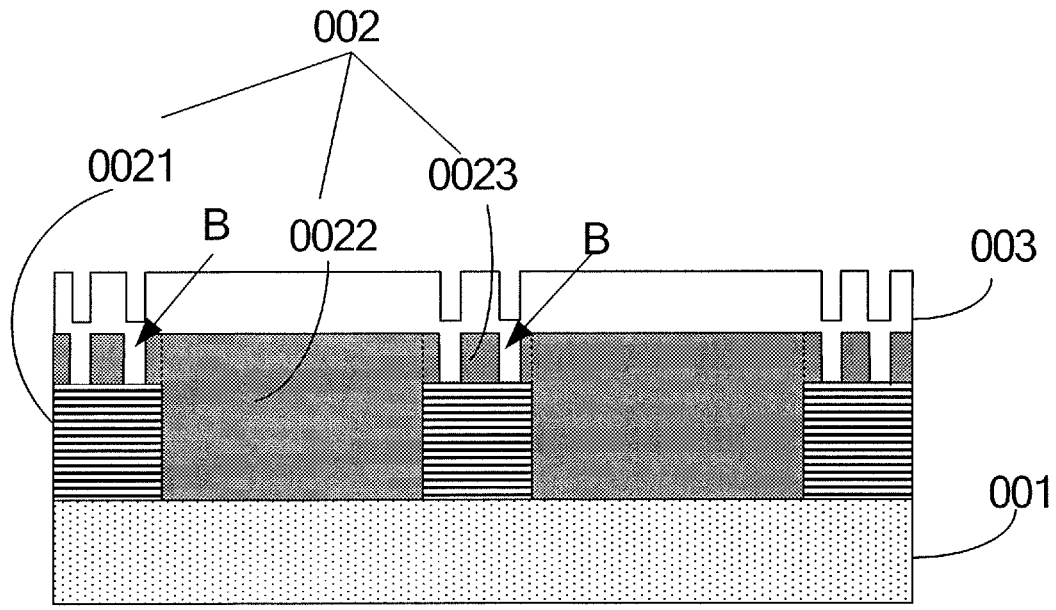
FIG. 11 is a structural schematic view of forming a transparent electrode layer on a color filter layer in the first specific preparation method provided in an embodiment of the present application.
Figures 1, 11:
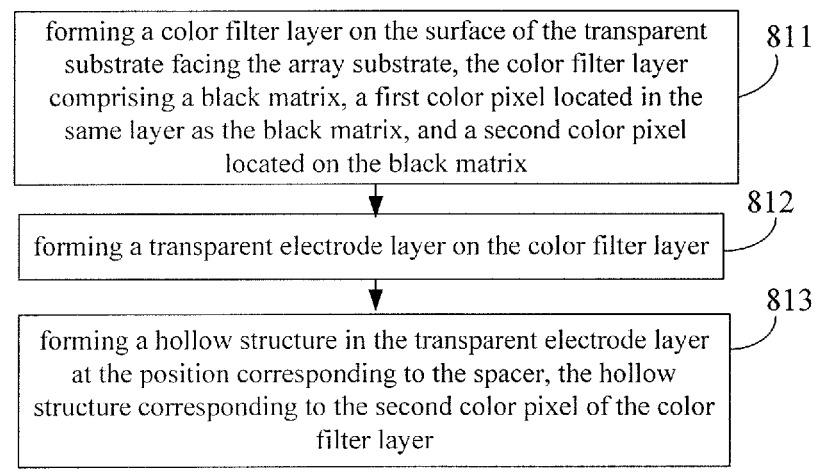

As shown in FIG. 11, the transparent electrode layer 003 may be coated on the surface of the color filter layer 002 formed with the hollow structure B. In some embodiments, the method for forming the transparent electrode layer 003 on the surface of the color filter layer 002 formed with the hollow structure B may also be deposition or sputtering and is not restricted in the embodiments of the present invention. Because the color filter layer 002 is provided with the hollow structure B on the surface thereof and the transparent electrode layer 003 has a small thickness, the transparent electrode layer 003 is formed with a concave-convex shape under the influence of the color filter layer 002. Moreover, in the color filter substrate as shown in FIG. 11, the spacer may be in contact with the surface of the transparent electrode layer 003 facing the array substrate and the concave-convex shape is used to increase the friction force between the color filter substrate 01 and the spacer.

Furthermore, after forming the color filter substrate, a spacer may be formed on the color filter substrate by one patterning process. Because the color filter substrate is formed with a hollow structure on the surface thereof and the hollow structure may comprise a closed loop hollow structure which may comprise at least one selected from the group consisting of closed circular hollow structure and closed rectangular hollow structure, that is, a stage difference occurs on the surface of the color filter substrate facing the array substrate, the bottom surface and the top surface of the spacer formed on the color filter substrate are in contact with the color filter substrate and the array substrate, respectively, that is, stage differences also occurs on the bottom surface and the top surface of the spacer. Under the effect of the hollow structure, a concave-convex shape is formed on the bottom surface and the top surface of the spacer. Under the effect of the concave-convex shape, not only the friction force between the color filter substrate and the spacer but also the friction force between the spacer and the array substrate are increased, and the spacer can be firmly located between the color filter substrate and the array substrate. In this way, the spacer is prevented from moving under an external force when the display panel formed by cell assembly from the array substrate and the color filter substrate is pressed by the external force. When a light emitted from a back light is irradiated on the liquid crystal display device, the spacer is located at the same position as the predetermined position, thereby decreasing the stripes on the surface of the liquid crystal display device and improving the display effect.

In summary, in the method for preparing the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

As shown in FIG. 11-1, an embodiment of the present invention provides the second specific method for preparing a color filter substrate. The method for preparing the color filter substrate can be used for preparing the color filter substrate as shown in FIG. 3-2. It needs to be noted that the color filter substrate 01 as shown in FIG. 3-2 can be suitable for display panels having a Twisted Nematic (TN) structure. The color filter substrate may comprise a transparent substrate, and the method for preparing the color filter substrate may comprise steps 811, 812 and 813.

Step 811: forming a color filter layer on the surface of the transparent substrate facing the array substrate, the color filter layer comprising a black matrix, a first color pixel located in the same layer as the black matrix, and a second color pixel located on the black matrix.

For example, as for the details of step 811, reference may be made to step 801 in the method for preparing the color filter substrate as shown in FIG. 8.

Step 812: forming a transparent electrode layer on the color filter layer.

For example, the transparent electrode layer may be coated on the color filter layer. The method for forming the transparent electrode layer may also be deposition or sputtering and is not restricted in the embodiments of the present invention.

Step 813: forming a hollow structure in the transparent electrode layer at the position corresponding to the spacer, the hollow structure corresponding to the second color pixel of the color filter layer.

In some embodiments, if the transparent electrode layer is formed on the color filter layer by sputtering in step 812, a mask with the same shape as the hollow structure may be used for masking during sputtering such that the transparent electrode layer is formed with a hollow structure corresponding to the second color pixel of the color filter layer. It needs to be noted that other processes may be used for the hollow structure in the transparent electrode layer at the position corresponding to the spacer and are not restricted in the embodiments of the present invention.

Furthermore, after forming the color filter substrate, a spacer may be formed on the color filter substrate by one patterning process. Because the color filter substrate is formed with a hollow structure on the surface thereof and the hollow structure may comprise a closed loop hollow structure which may comprise at least one of closed circular hollow structure and closed rectangular hollow structure, that is, a stage difference occurs on the surface of the color filter substrate facing the array substrate, the bottom surface and the top surface of the spacer formed on the color filter substrate are in contact with the color filter substrate and the array substrate, respectively, that is, stage differences also occurs on the bottom surface and the top surface of the spacer. Under the effect of the hollow structure, a concave-convex shape is formed on the bottom surface and the top surface of the spacer. Under the effect of the concave-convex shape, not only the friction force between the color filter substrate and the spacer but also the friction force between the spacer and the array substrate are increased, and the spacer can be firmly located between the color filter substrate and the array substrate. In this way, the spacer is prevented from moving under an external force when the display panel formed by cell assembly from the array substrate and the color filter substrate is pressed by the external force. When a light emitted from a back light is irradiated on the liquid crystal display device, the spacer is located at the same position as the predetermined position, thereby decreasing the stripes on the surface of the liquid crystal display device and improving the display effect.

In summary, in the method for preparing the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

Figure 12:
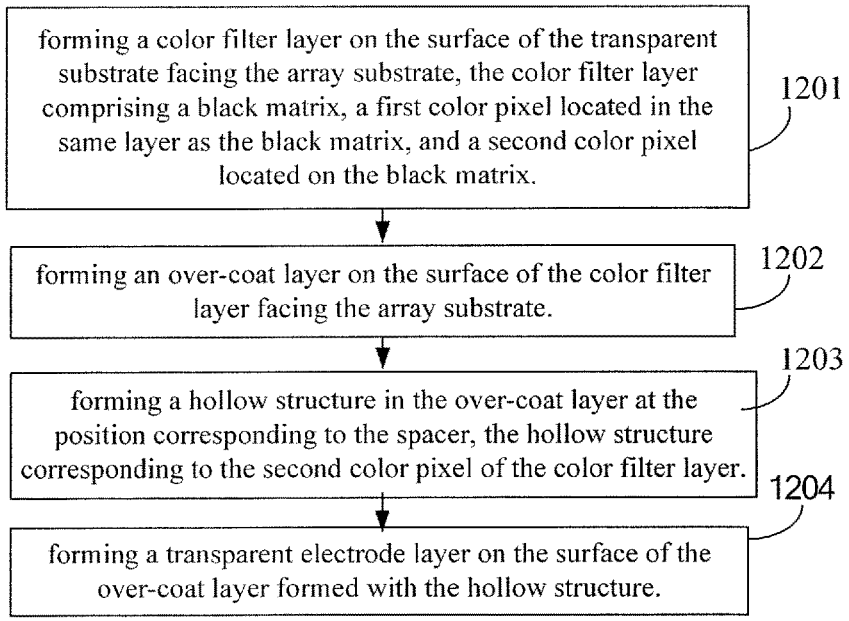
FIG. 12 is a process flow view of a third specific method for preparing a color filter substrate provided in an embodiment of the present application.

As shown in FIG. 12, an embodiment of the present invention provides the third specific method for preparing a color filter substrate. The method for preparing the color filter substrate can be used for preparing the color filter substrate as shown in FIG. 4. It needs to be noted that the color filter substrate 01 as shown in FIG. 4 can be suitable for display panels having a Twisted Nematic (TN) structure. The color filter substrate may comprise a transparent substrate, and the method for preparing the color filter substrate may comprise steps 1201, 1202, 1203, and 1204.

Step 1201: forming a color filter layer on the surface of the transparent substrate facing the array substrate, the color filter layer comprising a black matrix, a first color pixel located in the same layer as the black matrix, and a second color pixel located on the black matrix.

Figure 13:
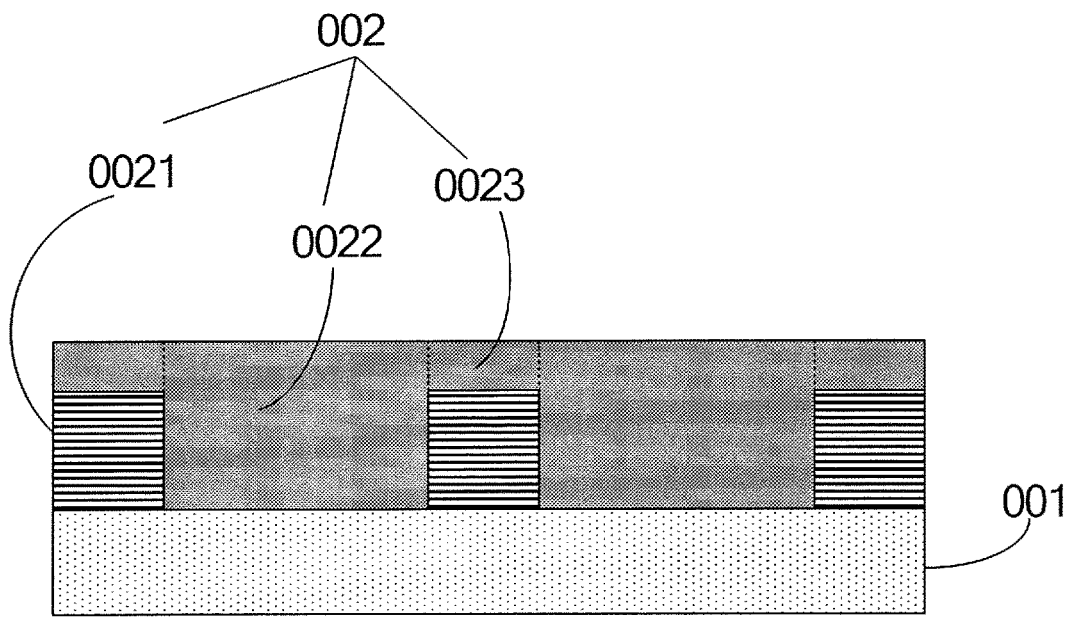
FIG. 13 is a structural schematic view of forming a color filter layer on a transparent substrate in the third specific preparation method provided in an embodiment of the present application.

For example, as shown in FIG. 13, a color filter layer 002 may be formed on the surface of the transparent substrate 001 facing the array substrate by a patterning process, and the color filter layer 002 may comprise a black matrix 0021, a first color pixel 0022 located in the same layer as the black matrix 0021, and a second color pixel 0023 located on the black matrix 0021. In some embodiments, the patterning process may comprise photoresist coating, exposure, development, etching, photoresist stripping and other processes. As for the specific steps for forming a color filter layer 002 on the surface of the transparent substrate 001 facing the array substrate, reference may be made to the specific steps for forming a color filter layer on the transparent substrate in prior art and are not described repeatedly in the embodiments of the present invention.

Step 1202: forming an over-coat layer on the surface of the color filter layer facing the array substrate.

Figure 14:
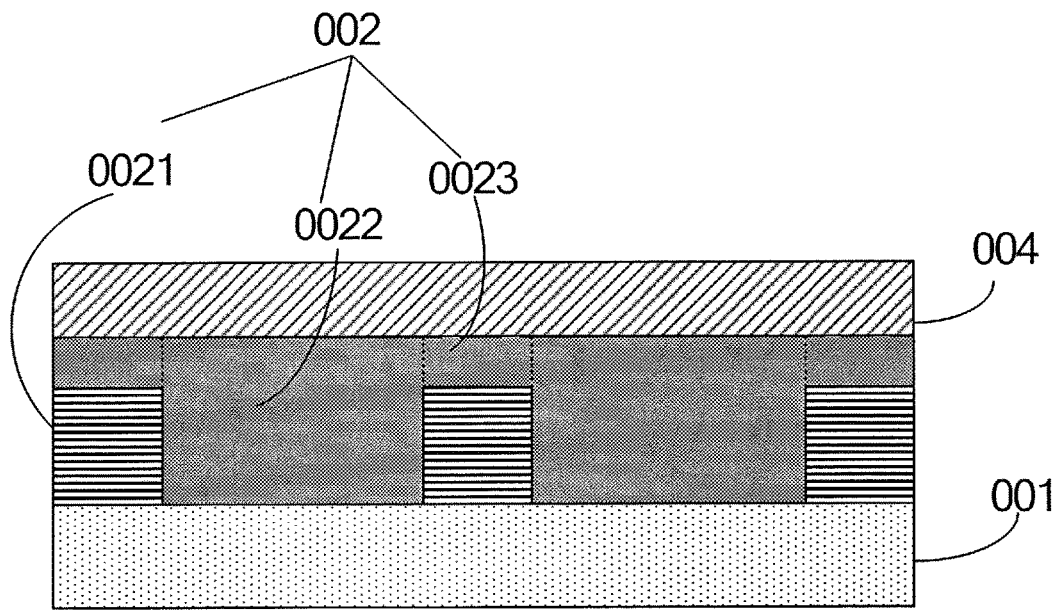
FIG. 14 is a structural schematic view of forming an over-coat layer on a color filter layer in the third specific preparation method provided in an embodiment of the present application.

For example, as shown in FIG. 14, the over-coat layer 004 may be coated on the surface of the color filter layer 002 facing the array substrate. In some embodiments, the method for forming the over-coat layer 004 on the surface of the color filter layer 002 facing the array substrate may also be deposition or sputtering and is not restricted in the embodiments of the present invention.

Step 1203: forming a hollow structure in the over-coat layer at the position corresponding to the spacer, the hollow structure corresponding to the second color pixel of the color filter layer.

Figure 15:
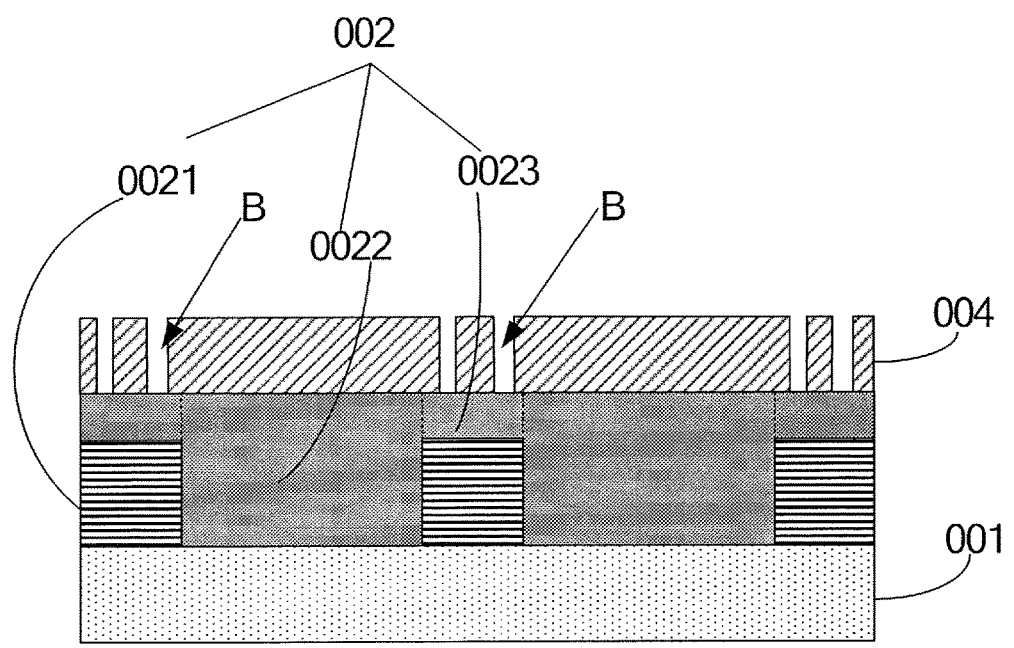
FIG. 15 is a structural schematic view of forming a hollow structure in an over-coat layer in the third specific preparation method provided in an embodiment of the present application.

As shown in FIG. 15, a hollow structure B may be formed in the over-coat layer 004 at the position corresponding to the spacer by a patterning process. The patterning process may comprise photoresist coating, exposure, development, etching, photoresist stripping and other processes. It needs to be noted that the hollow structure B corresponding to the second color pixel 0023 of the color filter layer 002 may be formed in the over-coat layer 004 at the position corresponding to the spacer by other patterning process which is not restricted in the embodiments of the present invention.

Step 1204: forming a transparent electrode layer on the surface of the over-coat layer formed with the hollow structure.

Figure 16:
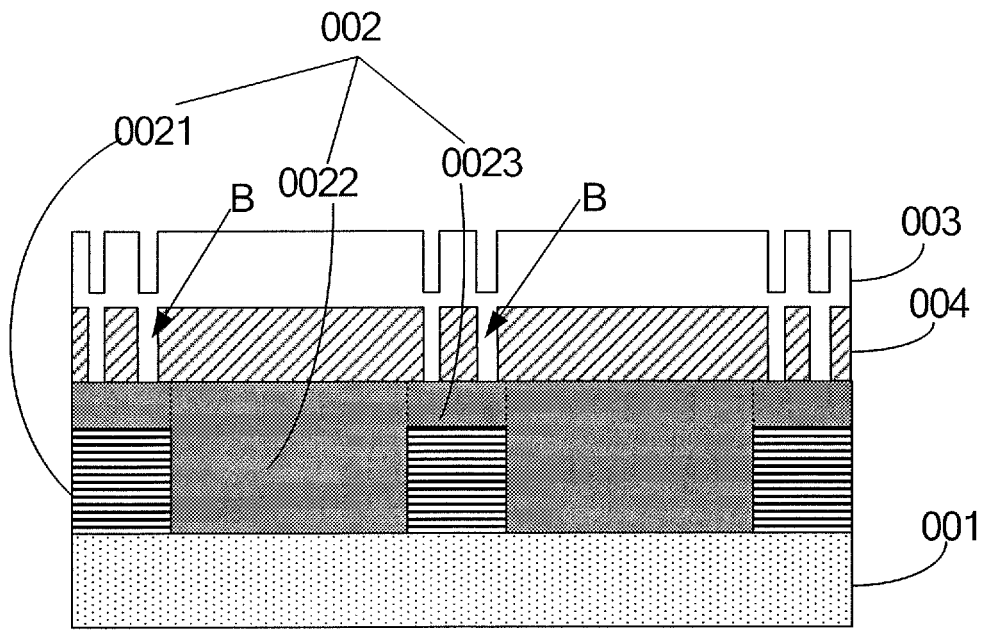
FIG. 16 is a structural schematic view of forming a transparent electrode layer on an over-coat layer in the third specific preparation method provided in an embodiment of the present application.
Figures 1, 16:
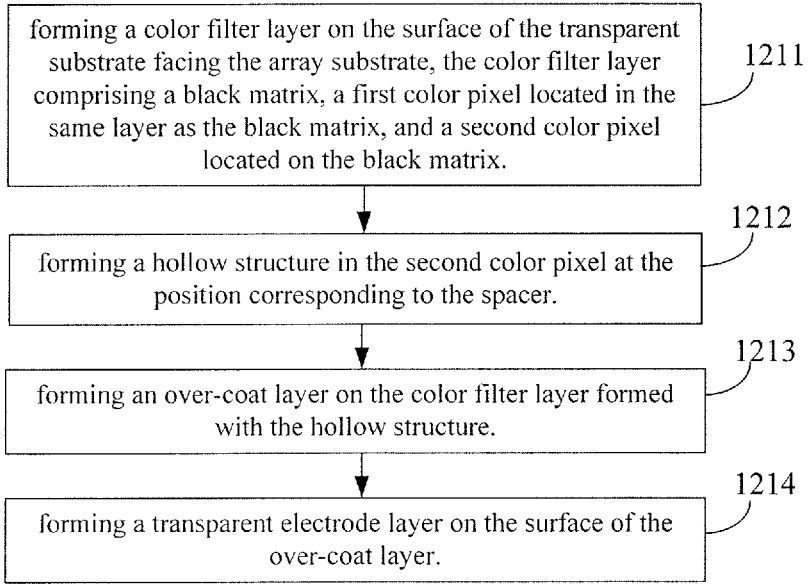
Figures 2, 16:
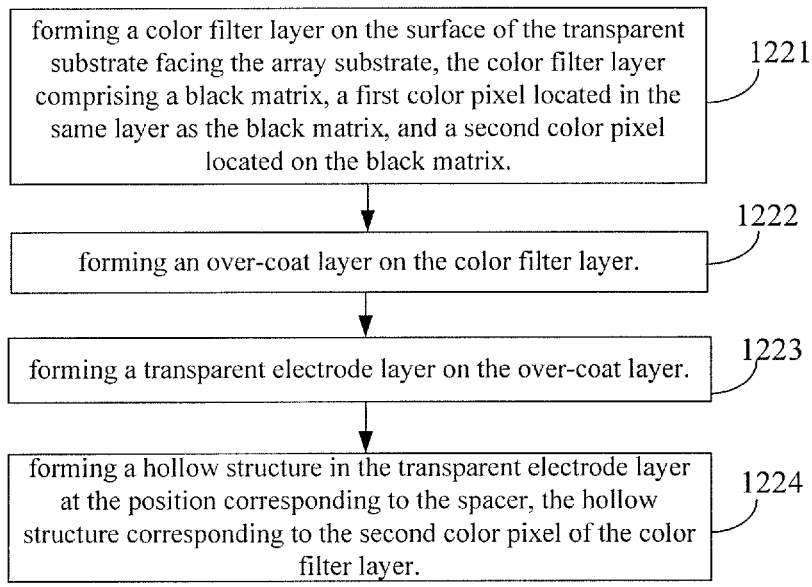

As shown in FIG. 16, the transparent electrode layer 003 may be coated on the surface of the over-coat layer 004 formed with the hollow structure B. In some embodiments, the method for forming the transparent electrode layer 003 on the surface of the over-coat layer 004 formed with the hollow structure B may also be deposition or sputtering and is not restricted in the embodiments of the present invention. Because the over-coat layer 004 is provided with the hollow structure B on the surface thereof and the transparent electrode layer 003 has a small thickness, the transparent electrode layer 003 is formed with a concave-convex shape under the influence of the over-coat layer 004. Moreover, in the color filter substrate as shown in FIG. 16, the spacer may be in contact with the surface of the transparent electrode layer 003 facing the array substrate and the concave-convex shape is used to increase the friction force between the color filter substrate 01 and the spacer.

Furthermore, after forming the color filter substrate, a spacer may be formed on the color filter substrate by one single patterning process. Because the color filter substrate is formed with a hollow structure on the surface thereof and the hollow structure may comprise a closed loop hollow structure which may comprise at least one of closed circular hollow structure and closed rectangular hollow structure, that is, the surface of the color filter substrate facing the array substrate is uneven, that is, a stage difference occurs on the surface of the color filter substrate facing the array substrate, the bottom surface and the top surface of the spacer formed on the color filter substrate are in contact with the color filter substrate and the array substrate, respectively, that is, stage differences also occurs on the bottom surface and the top surface of the spacer. Under the effect of the hollow structure, a concave-convex shape is formed on the bottom surface and the top surface of the spacer. Under the effect of the concave-convex shape, not only the friction force between the color filter substrate and the spacer but also the friction force between the spacer and the array substrate are increased, and the spacer can be firmly located between the color filter substrate and the array substrate. In this way, the spacer is prevented from moving under an external force when the display panel formed by cell assembly from the array substrate and the color filter substrate is pressed by the external force. When a light emitted from a back light is irradiated on the liquid crystal display device, the spacer is located at the same position as the predetermined position, thereby decreasing the stripes on the surface of the liquid crystal display device and improving the display effect.

In summary, in the method for preparing the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

As shown in FIG. 16-1, an embodiment of the present invention provides the fourth specific method for preparing a color filter substrate. The method for preparing the color filter substrate can be used for preparing the color filter substrate as shown in FIG. 4-1. It needs to be noted that the color filter substrate 01 as shown in FIG. 4-1 can be suitable for display panels having a Twisted Nematic (TN) structure. The color filter substrate may comprise a transparent substrate, and the method for preparing the color filter substrate may comprise steps 1211, 1212, 1213, and 1214.

Step 1211: forming a color filter layer on the surface of the transparent substrate facing the array substrate, the color filter layer comprising a black matrix, a first color pixel located in the same layer as the black matrix, and a second color pixel located on the black matrix.

For example, as for the details of step 1211, reference may be made to step 1201 in the method for preparing the color filter substrate as shown in FIG. 12.

Step 1212: forming a hollow structure in the second color pixel at the position corresponding to the spacer.

A hollow structure B may be formed in the second color pixel at the position corresponding to the spacer by a patterning process. The patterning process may comprise photoresist coating, exposure, development, etching, photoresist stripping and other processes. It needs to be noted that the hollow structure may be formed in the second color pixel at the position corresponding to the spacer by other patterning process which is not restricted in the embodiments of the present invention.

Step 1213: forming an over-coat layer on the color filter layer formed with the hollow structure.

For example, the over-coat layer may be coated on the surface of the color filter layer, which is formed with the hollow structure, facing the array substrate. In some embodiments, the method for forming the over-coat layer on the surface of the color filter layer, which is formed with the hollow structure, facing the array substrate may also be deposition or sputtering and is not restricted in the embodiments of the present invention.

Step 1214: forming a transparent electrode layer on the surface of the over-coat layer.

The transparent electrode layer may be coated on the surface of the over-coat layer. In some embodiments, the method for forming the transparent electrode layer on the surface of the over-coat layer formed with the hollow structure may also be deposition or sputtering and is not restricted in the embodiments of the present invention.

Furthermore, after forming the color filter substrate, a spacer may be formed on the color filter substrate by one patterning process. Because the color filter substrate is formed with a hollow structure on the surface thereof and the hollow structure may comprise a closed loop hollow structure which may comprise at least one of closed circular hollow structure and closed rectangular hollow structure, that is, the surface of the color filter substrate facing the array substrate is uneven, that is, a stage difference occurs on the surface of the color filter substrate facing the array substrate, the bottom surface and the top surface of the spacer formed on the color filter substrate are in contact with the color filter substrate and the array substrate, respectively, that is, stage differences also occurs on the bottom surface and the top surface of the spacer. Under the effect of the hollow structure, a concave-convex shape is formed on the bottom surface and the top surface of the spacer. Under the effect of the concave-convex shape, not only the friction force between the color filter substrate and the spacer but also the friction force between the spacer and the array substrate are increased, and the spacer can be firmly located between the color filter substrate and the array substrate. In this way, the spacer is prevented from moving under an external force when the display panel formed by cell assembly from the array substrate and the color filter substrate is pressed by the external force. When a light emitted from a back light is irradiated on the liquid crystal display device, the spacer is located at the same position as the predetermined position, thereby decreasing the stripes on the surface of the liquid crystal display device and improving the display effect.

In summary, in the method for preparing the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

As shown in FIG. 16-2, an embodiment of the present invention provides the fifth specific method for preparing a color filter substrate. The method for preparing the color filter substrate can be used for preparing the color filter substrate as shown in FIG. 4-2. It needs to be noted that the color filter substrate 01 as shown in FIG. 4-2 can be suitable for display panels having a Twisted Nematic (TN) structure. The color filter substrate may comprise a transparent substrate, and the method for preparing the color filter substrate may comprise steps 1221, 1222, 1223, and 1224.

Step 1221: forming a color filter layer on the surface of the transparent substrate facing the array substrate, the color filter layer comprising a black matrix, a first color pixel located in the same layer as the black matrix, and a second color pixel located on the black matrix.

For example, as for the details of step 1221, reference may be made to step 1201 in the method for preparing the color filter substrate as shown in FIG. 12.

Step 1222: forming an over-coat layer on the color filter layer.

For example, the over-coat layer may be coated on the surface of the color filter layer facing the array substrate. In some embodiments, the method for forming the over-coat layer on the surface of the color filter layer facing the array substrate may also be deposition or sputtering and is not restricted in the embodiments of the present invention.

Step 1223: forming a transparent electrode layer on the over-coat layer.

The transparent electrode layer may be coated on the surface of the over-coat layer. In some embodiments, the method for forming the transparent electrode layer on the surface of the over-coat layer may also be deposition or sputtering and is not restricted in the embodiments of the present invention.

Step 1224: forming a hollow structure in the transparent electrode layer at the position corresponding to the spacer, the hollow structure corresponding to the second color pixel of the color filter layer.

As for the details of step 1224, reference may be made to step 813 in the method for preparing the color filter substrate as shown in FIG. 11-1.

Furthermore, after forming the color filter substrate, a spacer may be formed on the color filter substrate by one patterning process. Because the color filter substrate is formed with a hollow structure on the surface thereof and the hollow structure may comprise a closed loop hollow structure which may comprise at least one of closed circular hollow structure and closed rectangular hollow structure, that is, the surface of the color filter substrate facing the array substrate is uneven, that is, a stage difference occurs on the surface of the color filter substrate facing the array substrate, the bottom surface and the top surface of the spacer formed on the color filter substrate are in contact with the color filter substrate and the array substrate, respectively, that is, stage differences also occurs on the bottom surface and the top surface of the spacer. Under the effect of the hollow structure, a concave-convex shape is formed on the bottom surface and the top surface of the spacer. Under the effect of the concave-convex shape, not only the friction force between the color filter substrate and the spacer but also the friction force between the spacer and the array substrate are increased, and the spacer can be firmly located between the color filter substrate and the array substrate. In this way, the spacer is prevented from moving under an external force when the display panel formed by cell assembly from the array substrate and the color filter substrate is pressed by the external force. When a light emitted from a back light is irradiated on the liquid crystal display device, the spacer is located at the same position as the predetermined position, thereby decreasing the stripes on the surface of the liquid crystal display device and improving the display effect.

In summary, in the method for preparing the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

Figure 17:
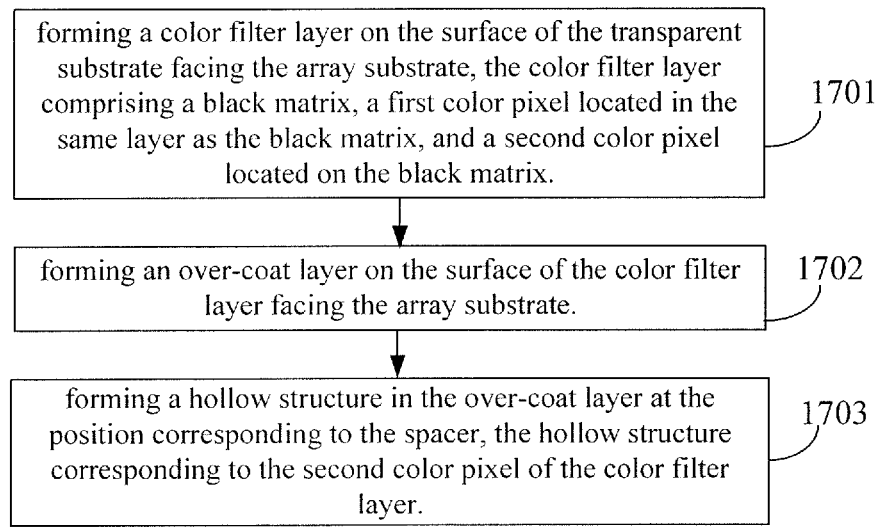
FIG. 17 is a process flow view of a sixth specific method for preparing a color filter substrate provided in an embodiment of the present application.

As shown in FIG. 17, an embodiment of the present invention provides the sixth specific method for preparing a color filter substrate. The method for preparing the color filter substrate can be used for preparing the color filter substrate as shown in FIG. 5. It needs to be noted that the color filter substrate 01 as shown in FIG. 5 can be suitable for display panels having an Advanced Super Dimension Switch (ADS) structure. The color filter substrate may comprise a transparent substrate, and the method for preparing the color filter substrate may comprise steps 1701, 1702, and 1703.

Step 1701: forming a color filter layer on the surface of the transparent substrate facing the array substrate, the color filter layer comprising a black matrix, a first color pixel located in the same layer as the black matrix, and a second color pixel located on the black matrix.

Figure 18:
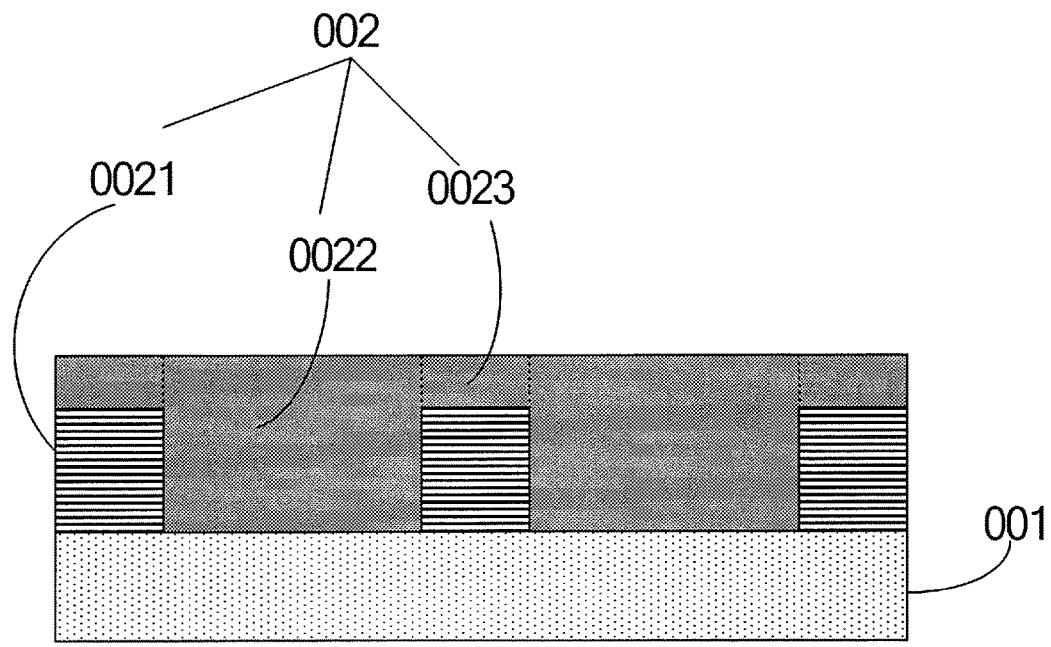
FIG. 18 is a structural schematic view of forming a color filter layer on a transparent substrate in the sixth specific preparation method provided in an embodiment of the present application.

For example, as shown in FIG. 18, a color filter layer 002 may be formed on the surface of the transparent substrate 001 facing the array substrate by a patterning process, and the color filter layer 002 may comprise a black matrix 0021, a first color pixel 0022 located in the same layer as the black matrix 0021, and a second color pixel 0023 located on the black matrix 0021. In some embodiments, the patterning process may comprise photoresist coating, exposure, development, etching, photoresist stripping and other processes. As for the specific steps for forming a color filter layer 002 on the surface of the transparent substrate 001 facing the array substrate, reference may be made to the specific steps for forming a color filter layer on the transparent substrate in prior art and are not described repeatedly in the embodiments of the present invention.

Step 1702: forming an over-coat layer on the surface of the color filter layer facing the array substrate.

Figure 19:
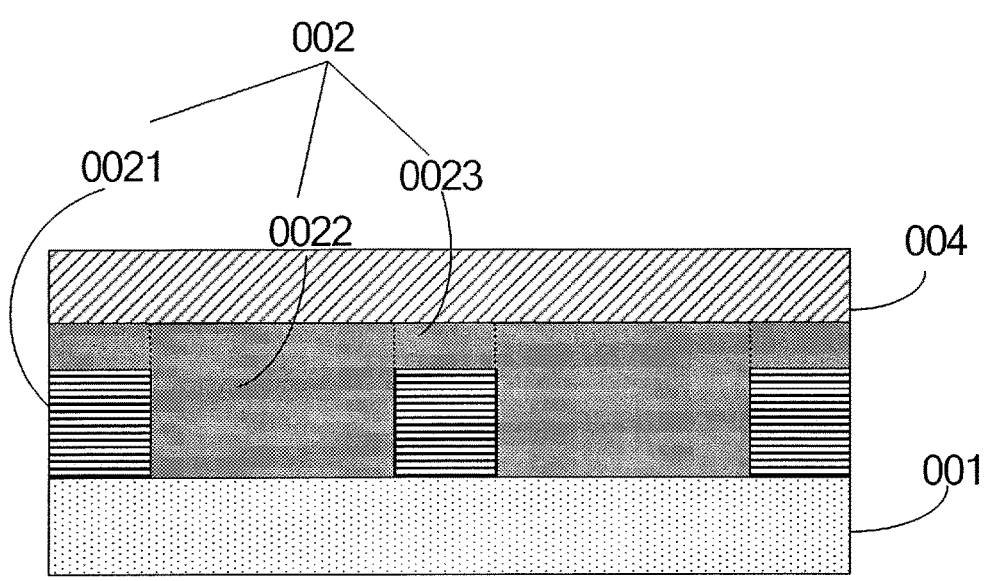
FIG. 19 is a structural schematic view of forming an over-coat layer on a color filter layer in the sixth specific preparation method provided in an embodiment of the present application.

For example, as shown in FIG. 19, the over-coat layer 004 may be coated on the surface of the color filter layer 002 facing the array substrate. In some embodiments, the method for forming the over-coat layer 004 on the surface of the color filter layer 002 facing the array substrate may also be deposition or sputtering and is not restricted in the embodiments of the present invention.

Step 1703: forming a hollow structure in the over-coat layer at the position corresponding to the spacer, the hollow structure corresponding to the second color pixel of the color filter layer.

Figure 20:
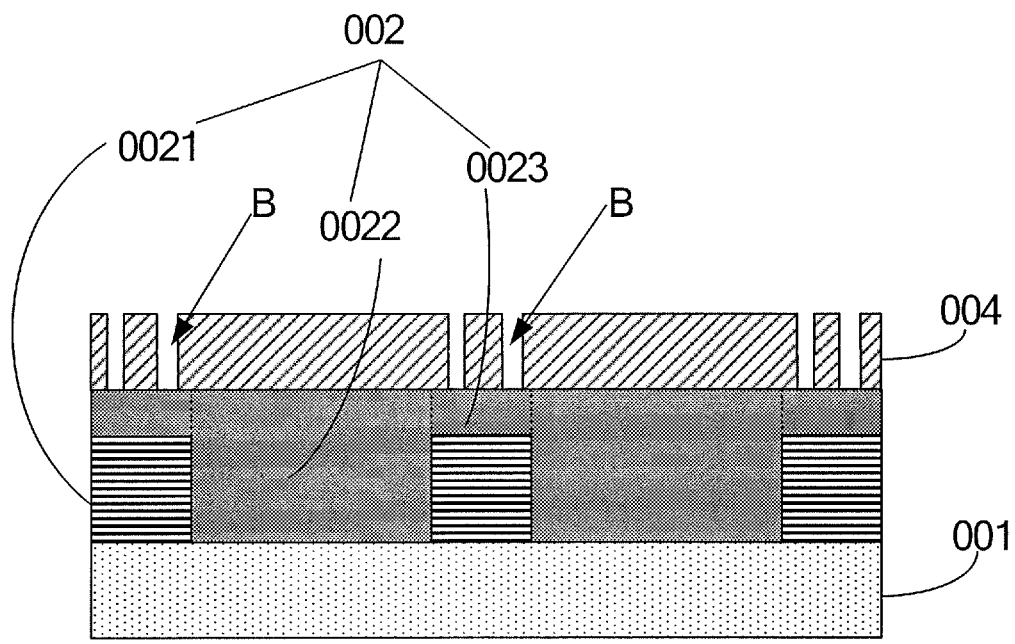
FIG. 20 is a structural schematic view of forming a hollow structure in an over-coat layer in the sixth specific preparation method provided in an embodiment of the present application.
Figures 1, 20:
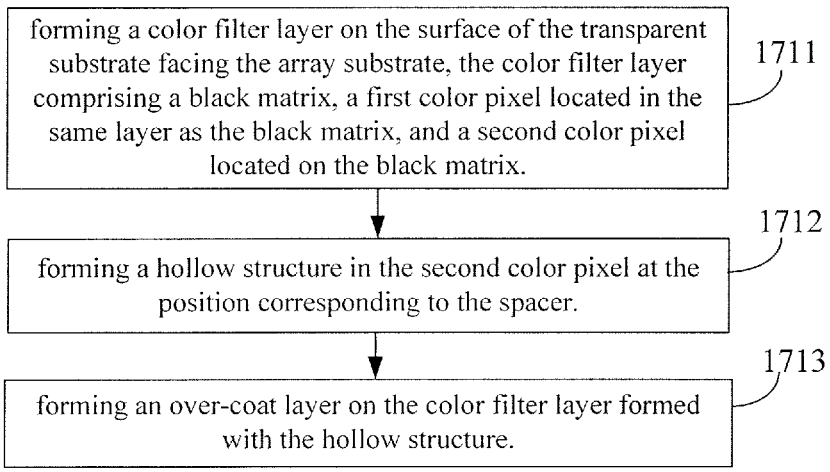

As shown in FIG. 20, the hollow structure B may be formed in the over-coat layer 004 at the position corresponding to the spacer by a patterning process. The patterning process may comprise photoresist coating, exposure, development, etching, photoresist stripping and other processes. It needs to be noted that the hollow structure B corresponding to the second color pixel 0023 of the color filter layer 002 may be formed in the over-coat layer 004 at the position corresponding to the spacer by other patterning process which is not restricted in the embodiments of the present invention.

Furthermore, after forming the color filter substrate, a spacer may be formed on the color filter substrate by one patterning process. Because the color filter substrate is formed with a hollow structure on the surface thereof and the hollow structure may comprise a closed loop hollow structure which may comprise at least one of closed circular hollow structure and closed rectangular hollow structure, that is, the surface of the color filter substrate facing the array substrate is uneven, that is, a stage difference occurs on the surface of the color filter substrate facing the array substrate, the bottom surface and the top surface of the spacer formed on the color filter substrate are in contact with the color filter substrate and the array substrate, respectively, that is, stage differences also occurs on the bottom surface and the top surface of the spacer. Under the effect of the hollow structure, a concave-convex shape is formed on the bottom surface and the top surface of the spacer. Under the effect of the concave-convex shape, not only the friction force between the color filter substrate and the spacer but also the friction force between the spacer and the array substrate are increased, and the spacer can be firmly located between the color filter substrate and the array substrate. In this way, the spacer is prevented from moving under an external force when the display panel formed by cell assembly from the array substrate and the color filter substrate is pressed by the external force. When a light emitted from a back light is irradiated on the liquid crystal display device, the spacer is located at the same position as the predetermined position, thereby decreasing the stripes on the surface of the liquid crystal display device and improving the display effect.

In summary, in the method for preparing the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

As shown in FIG. 20-1, an embodiment of the present invention provides the seventh specific method for preparing a color filter substrate. The method for preparing the color filter substrate can be used for preparing the color filter substrate as shown in FIG. 5-1. It needs to be noted that the color filter substrate 01 as shown in FIG. 5-1 can be suitable for display panels having an Advanced Super Dimension Switch (ADS) structure. The color filter substrate may comprise a transparent substrate, and the method for preparing the color filter substrate may comprise steps 1711, 1712, and 1713.

Step 1711: forming a color filter layer on the surface of the transparent substrate facing the array substrate, the color filter layer comprising a black matrix, a first color pixel located in the same layer as the black matrix, and a second color pixel located on the black matrix.

For example, as for the details of step 1711, reference may be made to step 1701 in the method for preparing the color filter substrate as shown in FIG. 17.

Step 1712: forming a hollow structure in the second color pixel at the position corresponding to the spacer.

A hollow structure may be formed in the second color pixel at the position corresponding to the spacer by a patterning process. The patterning process may comprise photoresist coating, exposure, development, etching, photoresist stripping and other processes. It needs to be noted that the hollow structure may be formed in the second color pixel at the position corresponding to the spacer by other patterning process which is not restricted in the embodiments of the present invention.

Step 1713: forming an over-coat layer on the color filter layer formed with the hollow structure.

For example, the over-coat layer may be coated on the surface of the color filter layer, which is formed with the hollow structure, facing the array substrate. In some embodiments, the method for forming the over-coat layer on the surface of the color filter layer, which is formed with the hollow structure, facing the array substrate may also be deposition or sputtering and is not restricted in the embodiments of the present invention.

Furthermore, after forming the color filter substrate, a spacer may be formed on the color filter substrate by one patterning process. Because the color filter substrate is formed with a hollow structure on the surface thereof and the hollow structure may comprise a closed loop hollow structure which may comprise at least one of closed circular hollow structure and closed rectangular hollow structure, that is, the surface of the color filter substrate facing the array substrate is uneven, that is, a stage difference occurs on the surface of the color filter substrate facing the array substrate, the bottom surface and the top surface of the spacer formed on the color filter substrate are in contact with the color filter substrate and the array substrate, respectively, that is, stage differences also occurs on the bottom surface and the top surface of the spacer. Under the effect of the hollow structure, a concave-convex shape is formed on the bottom surface and the top surface of the spacer. Under the effect of the concave-convex shape, not only the friction force between the color filter substrate and the spacer but also the friction force between the spacer and the array substrate are increased, and the spacer can be firmly located between the color filter substrate and the array substrate. In this way, the spacer is prevented from moving under an external force when the display panel formed by cell assembly from the array substrate and the color filter substrate is pressed by the external force. When a light emitted from a back light is irradiated on the liquid crystal display device, the spacer is located at the same position as the predetermined position, thereby decreasing the stripes on the surface of the liquid crystal display device and improving the display effect.

In summary, in the method for preparing the color filter substrate provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect.

Figure 21:
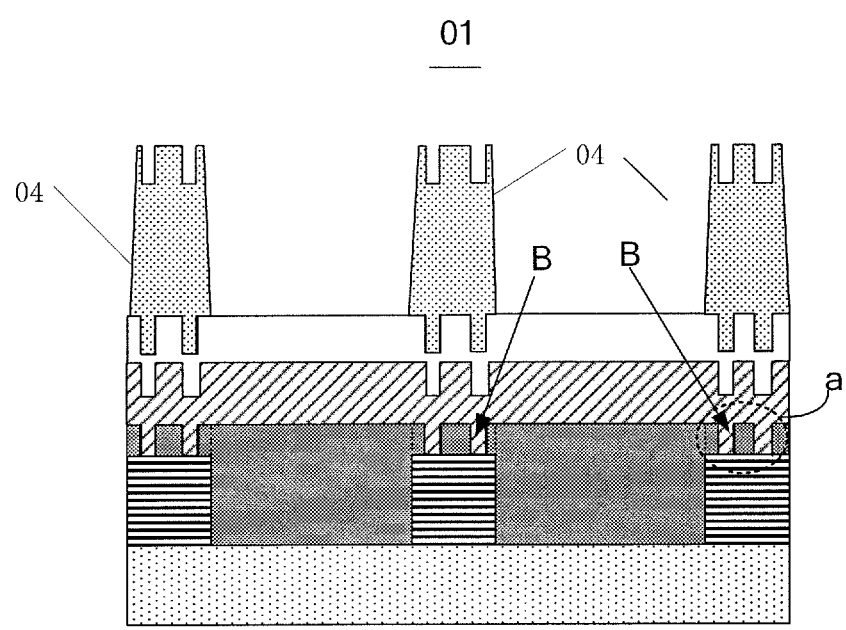
FIG. 21 is a structural schematic view of the cooperation of a color filter substrate provided in an embodiment of the present application and a corresponding spacer which having a concave-convex shape to increase the friction force between the color filter substrate and the spacer.

FIG. 21 shows a structural schematic view of the cooperation of a color filter substrate provided in an embodiment of the present invention and a corresponding spacer which having a concave-convex shape to increase the friction force between the color filter substrate and the spacer. In FIG. 21, the structure of the color filter substrate corresponds to the structural schematic view of the color filter substrate as shown in FIG. 2. As shown in FIG. 21, stage differences also occur on the bottom surface and the top surface of the spacer 04 formed on the color filter substrate. Under the effect of the hollow structure, a concave-convex shape is formed on the bottom surface and the top surface of the spacer 04, and on the surface of the spacer 04 being in contact with the color filter substrate, the convex part of the concave-convex shape corresponds to the hollow part of the hollow structure, while the concave part of the concave-convex shape corresponds to the non-hollow part of the hollow structure. The bottom surface and the top surface of the spacer 04 are in contact with the color filter substrate and the array substrate, respectively. Under the effect of the concave-convex shape, not only the friction force between the color filter substrate and the spacer but also the friction force between the spacer and the array substrate are increased, and the spacer can be firmly located between the color filter substrate and the array substrate. In this way, the spacer is prevented from moving under an external force when the display panel formed by cell assembly from the array substrate and the color filter substrate is pressed by the external force.

It needs to be noted that the structure of the spacer 04 with a concave-convex shape is not restricted hereto, and the spacer 04 with a concave-convex shape may be similarly applied in various embodiments of the color filter substrate as mentioned in the present invention.

An embodiment of the present invention provides a display panel which may comprises a color filter substrate and an array substrate which are cell-assembled. A spacer is provided between the color filter substrate and the array substrate. The structure of the color filter substrate may be as shown in FIG. 2, FIG. 3, FIG. 3-2, FIG. 4, FIG. 4-1, FIG. 4-2, FIG. 5 or FIG. 5-1. The display panel may be any product or component having display function, such as liquid crystal panel, electronic paper, mobile phone, tablet computer, TV set, display device, notebook computer, digital photo frame, navigator, etc.

In summary, in the display panel provided in the embodiment of the present invention, because at least one layer of the color filter substrate is a hollow structure which is used to increase the friction force between the color filter substrate and the spacer, the friction force between the spacer and the color filter substrate is increased. When the surface of the liquid crystal display device is pressed by an external force, the spacer is prevented from moving under the external force and departing from the predetermined position. When a light emitted from a back light is irradiated on the liquid crystal display device, the spacer is located at the same position as the predetermined position, thereby decreasing the stripes on the surface of the liquid crystal display device and improving the display effect. All the aforementioned optional technical solutions may be arbitrarily combined to form optional embodiments of the present invention which are not described repeatedly herein.

The above description is merely exemplary embodiments which are not used for limiting the scope of protection of the present invention which is, however, determined by the attached claims.

The present application claims the priority of the Chinese Patent Application No. 201510172510.1 submitted on Apr. 13, 2015, and the content disclosed in the above Chinese patent application is incorporated by reference as part of this application.

What is claimed is:

1. A color filter substrate, wherein the color filter substrate has a surface facing an array substrate and being in contact with a spacer, and
the color filter substrate has at least one layer having a hollow structure at a position corresponding to the spacer, wherein,
the color filter substrate comprises a transparent substrate which has a surface facing the array substrate and having a color filter layer formed thereon; and
the color filter layer comprises a black matrix, a first color pixel located in a same layer as the black matrix, and a second color pixel located on the black matrix, and the second color pixel has the hollow structure at the position corresponding to the spacer.

2. The color filter substrate according to claim 1, wherein, a surface of the spacer that is in contact with the color filter substrate has a concave-convex shape thereon; and a convex part of the concave-convex shape corresponds to a hollow part of the hollow structure, a concave part of the concave-convex shape corresponds to a non-hollow part of the hollow structure.

3. The color filter substrate according to claim 1, wherein, the color filter substrate comprises a transparent substrate which has a surface facing the array substrate and having a color filter layer formed thereon;
an over-coat layer is formed on a surface of the color filter layer facing the array substrate; and
the color filter layer comprises a black matrix, a first color pixel located in a same layer as the black matrix, and a second color pixel located on the black matrix, and the over-coat layer has the hollow structure at the position corresponding to the spacer.

4. The color filter substrate according to claim 1, wherein, the color filter substrate comprises a transparent substrate which has a surface facing the array substrate and having a color filter layer formed thereon;
an over-coat layer is formed on a surface of the color filter layer facing the array substrate;
a transparent electrode layer is formed on a surface of the over-coat layer facing the array substrate; and
the color filter layer comprises a black matrix, a first color pixel located in a same layer as the black matrix, and a second color pixel located on the black matrix, and the over-coat layer has the hollow structure at the position corresponding to the spacer.

5. The color filter substrate according to claim 1, wherein, the hollow structure comprises a closed loop hollow structure.

6. The color filter substrate according to claim 5, wherein, the closed loop hollow structure comprises at least one selected from the group consisting of circular hollow structure and rectangular hollow structure.

7. The color filter substrate according to claim 1, wherein, the hollow structure is configured such that a part of the spacer is protruded into the hollow structure, thereby increasing a friction force between the color filter substrate and the spacer.

8. The color filter substrate according to claim 3, wherein, a position of at least one of the hollow structure and/or the spacer corresponds to a position of the second color pixel.

9. The color filter substrate according to claim 4, wherein, a position of at least one of the hollow structure and/or the spacer corresponds to a position of the second color pixel.

10. A method for preparing the color filter substrate according claim 1, the method comprising:
forming the hollow structure in at least one layer of the color filter substrate at the position corresponding to the spacer.

11. The method according to claim 10, wherein, the color filter substrate comprises a transparent substrate, and forming the hollow structure in at least one layer of the color filter substrate comprises:
forming a color filter layer on a surface of the transparent substrate facing the array substrate, the color filter layer comprising a black matrix, a first color pixel located in a same layer as the black matrix, and a second color pixel located on the black matrix; and
forming the hollow structure in the second color pixel at the position corresponding to the spacer.

12. The method according to claim 10, wherein, the color filter substrate comprises a transparent substrate, and forming the hollow structure in at least one layer of the color filter substrate comprises:
forming a color filter layer in the surface of the transparent substrate facing the array substrate, the color filter layer comprising a black matrix, a first color pixel located in a same layer as the black matrix, and a second color pixel located on the black matrix;
forming an over-coat layer on the surface of the color filter layer facing the array substrate; and
forming the hollow structure in the over-coat layer at the position corresponding to the spacer.

13. The method for preparing the color filter substrate according to claim 10, wherein, the color filter substrate comprises a transparent substrate, and forming the hollow structure in at least one layer of the color filter substrate comprises:
forming a color filter layer on a surface of the transparent substrate facing the array substrate, the color filter layer comprising a black matrix, a first color pixel located in a same layer as the black matrix, and a second color pixel located on the black matrix;
forming an over-coat layer on the surface of the color filter layer facing the array substrate;
forming a transparent electrode layer on the surface of the over-coat layer facing the array substrate; and
forming the hollow structure in the transparent electrode layer at the position corresponding to the spacer.

14. The method according to claim 10, wherein, the hollow structure comprises a closed loop hollow structure.

15. The method according to claim 14, wherein, the closed loop hollow structure comprises at least one selected from the group consisting of circular hollow structure and rectangular hollow structure.

16. The method according to claim 12, wherein, a position of at least one of the hollow structure and/or the spacer corresponds to a position of the second color pixel.

17. The method according to claim 13, wherein, a position of at least one of the hollow structure and/or the spacer corresponds to a position of the second color pixel.

18. A display panel, comprising:
the color filter substrate according to claim 1 and an array substrate which are cell-assembled, and
a spacer provided between the color filter substrate and the array substrate.

19. The display panel according to claim 18, wherein the spacer has a concave-convex shape; a convex part of the concave-convex shape corresponds to a hollow part of the hollow structure, and a concave part of the concave-convex shape corresponds to a non-hollow part of the hollow structure.

* * * * *